(12) United States Patent
Manning et al.

(10) Patent No.: US 11,974,014 B2
(45) Date of Patent: Apr. 30, 2024

(54) SYSTEMS AND METHODS FOR DYNAMICALLY EDUCATING USERS ON SPORTS TERMINOLOGY

(71) Applicant: Rovi Guides, Inc., San Jose, CA (US)

(72) Inventors: Scott Manning, Lansdowne, PA (US); Jeffrey Glahn, Malvern, PA (US); Kyle Smetanka, Philadelphia, PA (US); Evangeline Castaneda, West Chester, PA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 18/102,012

(22) Filed: Jan. 26, 2023

(65) Prior Publication Data

US 2023/0319349 A1    Oct. 5, 2023

Related U.S. Application Data

(63) Continuation of application No. 16/761,428, filed as application No. PCT/US2017/061055 on Nov. 10, 2017, now Pat. No. 11,595,722.

(51) Int. Cl.
| | |
|---|---|
| *H04N 21/442* | (2011.01) |
| *G06F 16/735* | (2019.01) |
| *G06F 16/738* | (2019.01) |
| *H04N 21/466* | (2011.01) |
| *H04N 21/488* | (2011.01) |
| *H04N 21/81* | (2011.01) |

(52) U.S. Cl.
CPC ..... *H04N 21/44213* (2013.01); *G06F 16/735* (2019.01); *G06F 16/738* (2019.01); *H04N 21/44226* (2020.08); *H04N 21/4667* (2013.01); *H04N 21/4882* (2013.01); *H04N 21/8126* (2013.01)

(58) Field of Classification Search
CPC ....... H04N 21/44213; H04N 21/44226; H04N 21/4667; H04N 21/4882; H04N 21/8126; G06F 16/735; G06F 16/738; G06F 16/74
See application file for complete search history.

(56) References Cited

U.S. PATENT DOCUMENTS

| | | | |
|---|---|---|---|
| 8,966,530 B2 | 2/2015 | Sinha et al. | |
| 9,047,089 B2 * | 6/2015 | Berenson | G06F 1/3293 |
| 9,069,651 B2 | 6/2015 | Barber | |
| 9,361,005 B2 | 6/2016 | Wheatley et al. | |
| 9,451,315 B2 * | 9/2016 | Pearlman | H04N 21/8545 |
| 9,727,561 B1 | 8/2017 | Ko et al. | |
| 11,595,722 B2 | 2/2023 | Manning et al. | |
| 2009/0171937 A1 | 7/2009 | Chen et al. | |
| 2011/0298983 A1 * | 12/2011 | Masuo | H04N 21/4316 |
| | | | 348/584 |
| 2012/0246671 A1 | 9/2012 | Wilson et al. | |
| 2014/0098008 A1 * | 4/2014 | Hatton | G06T 11/00 |
| | | | 345/8 |

(Continued)

*Primary Examiner* — Nathan J Flynn
*Assistant Examiner* — Christine A Kurien
(74) *Attorney, Agent, or Firm* — Haley Guiliano LLP

(57) ABSTRACT

Systems and methods are described for a media guidance application (e.g., implemented on a user device) that explains sports terminology to a user accessing content that corresponds to a sporting event. The media guidance application may detect terms used in the content, determine the terms are unique to the sport, and display definitions and explanations alongside the terms.

20 Claims, 9 Drawing Sheets

(56) References Cited

U.S. PATENT DOCUMENTS

| | | | |
|---|---|---|---|
| 2014/0373082 A1* | 12/2014 | Miyazaki | H04N 21/4415 725/110 |
| 2016/0301974 A1* | 10/2016 | Hough | H04N 21/2668 |
| 2016/0314410 A1 | 10/2016 | Carmichael et al. | |
| 2016/0316238 A1 | 10/2016 | Carmichael et al. | |
| 2017/0249388 A1* | 8/2017 | Alonso | G06F 16/9535 |
| 2018/0007449 A1* | 1/2018 | Carlson | H04N 21/42209 |
| 2018/0302687 A1 | 10/2018 | Bhattacharjee et al. | |

* cited by examiner

SYSTEMS AND METHODS FOR DYNAMICALLY EDUCATING USERS ON SPORTS TERMINOLOGY

CROSS-REFERENCE TO RELATED APPLICATION

This application is a continuation of U.S. patent application Ser. No. 16/761,428, filed May 4, 2020, which is a national stage application under 35 U.S.C. § 371 of International Application PCT/US2017/061055, filed Nov. 10, 2017, which are hereby incorporated by reference herein in their entireties.

BACKGROUND

The amount of media available to users in any given media delivery system can be substantial. Unfortunately, users unfamiliar with the media can be exposed to large amounts of information which may be difficult to comprehend. In particular, media associated with sports can feature technical terms and colloquial phrases that can alienate a user and prevent him/her from enjoying the content, or understanding the sport. Conventional media systems may define technical terms in a media asset, but they do not consider the education level or previous exposure to the media asset the user may have. As a result, conventional media systems may make inefficient use of resources, only to inundate the user with irrelevant information, making the media asset less enjoyable.

SUMMARY

Systems and methods are described to explain sports terminology to a user accessing content corresponding to a sporting event, based on his/her knowledge of the sport. For example, suppose that the user is watching a baseball game and a player in the game has hit a homerun. The media guidance application may determine that the user has never watched a baseball game and does not know much about baseball. As a result, the media guidance application may identify words that are either mentioned by the sports commentators, in closed-captioning, or on the display, such as "homerun," and define the words for the user. The media guidance application may generate for display, an overlay, that is presented to the user, with an explanation of the term. If the user accesses additional content corresponding to baseball in the future, the media guidance application may detect that the user has already been provided explanations of various terms such as "homerun," and either present a more advanced explanation of terms, or no explanation.

The media guidance application may detect that a user is currently accessing content corresponding to a sporting event of a given type. Suppose that the user is viewing a baseball game on his/her set-top box. It should be noted that the user may access on sporting event across various mediums such as on-demand content (e.g., VOD), Internet content (e.g., streaming media, downloadable media, etc.), locally stored content (e.g., content stored on any user equipment device described above or other storage device), or other time-independent content. The media guidance application may extract metadata associated with the baseball game, such as the name and the description of the content, to search for references to a sport. The media guidance application may specifically determine that the name of a sport (e.g., baseball) is found in the name or description of the content. Accordingly, the media guidance application may determine that the content is associated with the identified sporting event.

The media guidance application may determine a frequency representing how often the user views sporting events of the given type to establish an education level of the user associated with the given type of sporting event. For example, the media guidance application may refer to the viewing history of the user to identify media assets the user has previously viewed that correspond to the sporting event type. Suppose that the media guidance application identifies several media assets that the user previously accessed that correspond to baseball. The media guidance application may determine the time of access for each media asset and determine a frequency value (e.g., accessed one per week, twice a month, etc.) based on the number of times the user accessed the media assets in a given period of time. Based on the frequency value, the media guidance application may use a lookup table to determine an education level of the user in terms of the sport. For example, the media guidance application may determine that frequency of one time per day (e.g., the user views content associated with baseball on daily basis) indicates that the user has an "advanced" understanding of baseball. Therefore, the education level of the user may be "advanced" for baseball-related content. Alternatively, the media guidance application may determine that the user views baseball-related content with a frequency of once a week. Accordingly, the media guidance application may determine, using the lookup table, that the user's education level is "intermediate."

The media guidance application may then detect a term unique to the given type of sporting event in the content. The media guidance application may actively monitor for terms by analyzing any closed-captioning data associated with the content, sports commentary audio, or visual ques such as an in-game overlay of metrics when a player comes to bat. The media guidance application may utilize computer vision to process visual information, and natural language processing to identify words. For example, the user may be viewing a baseball game and the sports commentator may use the term "slugging percentage." The media guidance application may first identify the term using the processes mentioned, and then use a lookup table to determine that the term is unique to the sporting event type, baseball.

In response to determining that the education level of the user is less than a threshold, the media guidance application may present an explanation of the term to the user while the user accesses the content. The threshold may be a value associated with the identified term. For example, the lookup table that indicates whether the term is unique to the sporting event type may also provide a definition of the term and a threshold that represents the maximum education level that requires an explanation of the term. Suppose that the user's education level is "advanced" and the threshold is "expert," a value greater than the user's education level. In response to determining that the user's education level is lower than the threshold, the media guidance application may determine that the term "slugging percentage" should be provided and may generate, for display, an explanation to the user as he/she views the content.

In some aspects, the media guidance application may detect that a user is currently accessing content corresponding to a sporting event of a given type. In some embodiments, the content includes at least one of a linear media asset (e.g., television broadcast of a sports event), an on-demand media asset (e.g., a recording of a sports documentary), and social chatter on a social platform associated with the user (e.g., sports forum or discussion). Suppose that the user is accessing a baseball game on the television channel, FOX, on his/her set-top box. The media guidance application may retrieve channel metadata associated with FOX to determine what the user is viewing. Channel metadata, as generated by the content provider, may include information such as the media listings of the channel (e.g., the names of the television shows/movies broadcasted), respective content descriptions, and the content schedule (e.g., time stamps for each television show or movie). In this case, the media guidance application may determine that the name of the content the user is currently watching is "MLB Baseball: New York Yankees vs. Boston Red Sox," which has a description listed as "Major League Baseball season game between the New York Yankees and the Boston Red Sox." The media guidance application may retrieve or access a sports database that lists a variety of sports (e.g., baseball, basketball, tennis, etc.). The media guidance application may then search the name of the content, and/or the description, for a sport listed in the sports database. For example, the media guidance application may retrieve the term "baseball" from the sports database, search for "baseball" in the strings of the name and/or description, and determine that "baseball" is found in the string(s) (e.g., in the name of the content or in the description). Therefore, the media guidance application may detect that the user is currently accessing content corresponding to the sporting event type, baseball.

The media guidance application may search, based on the given type of the sporting event, a viewing history associated with the user to identify a plurality of media assets corresponding to sporting events of the given type. For example, the media guidance application may retrieve a user profile associated with the user that provides information such as the user's viewing history, content preferences, bookmarks, etc. The media guidance application may access the viewing history of the user to determine the media assets the user has viewed that correspond to the sport event type detected. For example, the media guidance application may search for the term "baseball" in the metadata of the media assets (e.g., name, description) found in the viewing history. Suppose that the user has rarely watched baseball. The media guidance application may determine that the viewing history only has three instances of media assets corresponding to baseball.

The media guidance application may retrieve a viewing time associated with each of the plurality of media assets. For example, the viewing history may also list time stamps of the times the user viewed the media assets. Consider the three media assets corresponding to baseball: game 1, game 2, and game 3. The media guidance application may determine the viewing times, based on the metadata of the media assets, as Oct. 2, 2015 at 5:00 pm, Oct. 2, 2016 at 6:00 μm, and Oct. 2, 2017 at 5:30 pm, respectively. In this case, game 3 may be the currently accessed content.

The media guidance application may compare an average of differences between the viewing times associated with each of the plurality of media assets. For example, the media guidance application may first determine the difference between the three media assets mentioned previously. The difference between the viewing time of game 1 and game 2 is one year and the difference between game 2 and game 3 is one year. Therefore, the media guidance application may determine that the average of differences between media assets is one year.

The media guidance application may determine, based on the computed average, a frequency representing how often the user views sporting events of the given type. The frequency may be a quantitative (e.g., 5 times per week, 10 times per month, etc.) or a qualitative value (e.g., often, very often, rarely, etc.). For example, the media guidance application may determine that the average difference between the media asset viewing times is one year. Therefore, the user watches media assets corresponding to baseball once a year. If the media guidance application relies on a qualitative frequency, the media guidance application may determine classifications of various numerical values. For example, the frequency 1 times per week may be classified as "not often," 3 times per week may be classified as "average," 5 times per week may be classified as "often," etc. In this case, the media guidance application may determine the frequency to be 1/52 times per week, which the media guidance application may classify as "rarely." The user may select whether the media guidance application should use qualitative values or quantitative values.

The media guidance application may search a database of education levels to identify a first education level associated with the determined frequency to establish a first sport education level of the user associated with the given type of sporting event. The first sport education level may represent the level of knowledge a user has about a specific sport, and is used to determine whether certain terms should be explained to the user and how complicated the explanations can be. The database of education levels may be a lookup table (e.g., array of strings) that lists education levels (e.g., some high school, high school diploma, some college, associate degree, bachelor degree, etc.) in separate rows and the frequency (e.g., rarely, average, often, etc.) in separate columns. The intersection of an education level and the frequency may indicate the first sport education level (e.g., completely new, beginner, intermediate, advanced, expert, etc.). For example, the intersection of "bachelor degree" and "often" may indicate that the user has an "advanced" first sport education level. The media guidance application may determine the first education level of the user by requesting user input of the education level, or referring to social media (e.g., education field of user's Facebook profile). In some embodiments, the media guidance application may receive user input setting a value for the education level of the user as the first education level. Suppose that the user indicates that his/her first education level is "high school diploma." The frequency, as determined by the media guidance application, is "rarely." The media guidance application may use these inputs to lookup the user's first sport education level. Based on the database of education levels, the media guidance application may determine that the user has a "beginner" first sport education level.

The media guidance application may process metadata associated with the currently accessed content to identify a plurality of terms describing the sporting event type. In some embodiments, processing the metadata associated with the currently accessed content comprises receiving closed-captioning information corresponding to the currently accessed content. For example, the media guidance application may determine that closed-captioning is available in the currently accessed content. The media guidance application may extract the closed-captioning data and identify words associated with the sporting event type. In the case that closed-captioning is not available, the media guidance application may also convert speech (e.g., sports commentary) in the currently accessed content to text using natural language processing (e.g., speech recognition).

In some embodiments, processing the metadata associated with the currently accessed content comprises processing visual information presented in the content to detect metrics of the sporting event type. For example, the media guidance application may utilize computer vision processes (e.g., segmentation, edge detection, classification) and natural language processing to identify visual information in the content. Suppose that a player hits a homerun in the baseball game. The word "Homerun" may appear on the screen. Furthermore, the score of the game may change accordingly. For example, the media guidance application may identify the word "Homerun" and the metrics and determine whether the word and metrics correspond to "baseball" based on the sports database.

The media guidance application may compare the identified plurality of terms with a list of terms associated with the given type of sporting event to detect a term of the plurality of terms that is unique to the given type of sporting event in the content. For example, the closed-captioning or the commentary may include a quote "and that ball is hit far—oh but it's just a foul-ball." The media guidance application may identify each word/phrase in the quote and determine the words/phrases that correspond solely to "baseball." The media guidance application may refer to the sports database to determine a list of terms that correspond to a sporting event. These words may include technical terms, player names, team names, events, etc. In this example, the media guidance application may determine that the sports database for the sporting event type of "baseball" includes the list of terms "ball," "hit," and "foul-ball." Therefore, the words "ball," "hit," and "foul-ball" from the quote correspond to the sporting event type, baseball. Furthermore, the media guidance application may determine that the terms "ball" and "hit" are not exclusive to "baseball" and are found in other sections of the sports database as well (e.g., cricket, tennis, etc.). In some embodiments, the sports database may feature an additional column that indicates whether a term is unique to the sport or the term's definition is unique to the sport (e.g., to account for sports that use similar terms with different definitions). Therefore, the media guidance application may determine that the term "foul-ball" is unique to the given type of sporting event, baseball.

The media guidance application may compare the first sport education level of the user to a threshold sport education level. The threshold sport education level may be associated with the term that is unique to the sporting event type. For example, the sports database may include a column that assigns each term a threshold sporting event educational level. In terms of baseball, terms such as "foul-ball," "homerun," or "base-hit" may be assigned a threshold sport education level of "beginner," whereas "slugging percentage" may be assigned "advanced." This may be because a viewer who is just beginning to watch baseball may need some basic information to get acclimated to the sport, whereas someone who regularly watches baseball, may not need an explanation of the basic words and may prefer getting explanations about more complex aspects of the sport. Therefore, the media guidance application may determine that the first sport education level of the user is equal to the threshold sport education level.

It should be noted that the threshold sport education level may also be a quantitative value. For example, the education levels may be ranked in a 1-10 scale where 1 represents a minimum education level and 10 represents the highest education level. Similarly, the threshold level may also be ranked in a scale from 1-10. Suppose that the sporting event type education of the user is 3 and the threshold sport education level for the term "foul-ball" is 4, the media guidance application may determine that the user's first sport education level is less than the threshold sport education level.

In response to determining that the first sport education level of the user is less than or equal to the threshold sport education level, the media guidance application may present an explanation of the term to the user while the user accesses the content. For example, the media guidance application may determine that the term "foul-ball" has a threshold sport education level of "beginner," which matches the user's first sport education level. Likewise, if the media guidance application is using quantitative representations of the education and threshold levels, the media guidance application may determine that the user's first sport education level is less than the threshold sport education level. In response, the media guidance application may retrieve a definition of the term "foul-ball" from the sports database, or from the Internet. If the media guidance application determines that the first sport education level of the user is greater than the threshold sport education level, the media guidance application may not present a definition. This is because the user may already know the definition of the term and may not wish to be inundated with definitions.

In some embodiments, presenting the explanation of the term comprises at least one of replacing a display of the term with the explanation, presenting an overlay over the content with the explanation adjacent to the term, highlighting the term in a display, and sending the explanation to a second screen device. For example, the media guidance application may highlight the term "foul-ball" in the closed-captioning and generate an overlay that defines the term. Alternatively, the user may replace the term "foul-ball" in the closed-captioning with its definition/explanation. The media guidance application may also send the explanation to a second device (e.g., phone, laptop, tablet, television, etc.) of the user, where the media guidance application on the second device generates, for display, the explanation. If the user is listening to an audio version of the sporting event type (e.g., on the radio), the media guidance application may also dictate the explanation of the term to the user. In some embodiments, the media guidance application may use speech recognition to wait for a portion of the audio when no sports commentary is taking place and dictate the explanation of the term.

In some embodiments, the media guidance application may detect that the user is accessing a second content corresponding to the sporting event type of the given type after a period of time of accessing the first content. For example, the user may access an on-demand media asset such as a sports documentary about the New York Yankees, a MLB baseball team. The media guidance application may retrieve metadata associated with the second content from the content provider and determine whether the name or description correspond to a sport in the sports database. In this case, the media guidance application may determine that the second content has metadata that references the terms "baseball" and "New York Yankees," which are terms found in the "baseball" section of the sports database. Therefore, the media guidance application may determine that the second content corresponds to the sporting event type, baseball. Furthermore, the media guidance application may retrieve the viewing history of the user from his/her user profile to determine the viewing time of the first content. Suppose that the user accessed the first content on Oct. 2, 2017. The user may be accessing the second content on Nov.

2, 2017. Thus, the period of time between the viewing time of the first content and the viewing time of the second content is one month.

The media guidance application may determine an increase in the frequency representing how often the user views sporting events of the given type. For example, the media guidance application may determine, based on the viewing times of the first content and the second content, that the viewing time difference is one month. In comparison, the average difference previously computed by the media guidance application was one year. Therefore, the media guidance application may detect an increase in the frequency (e.g., the user is accessing content related to the sporting event type more frequently). Alternatively, the media guidance application may re-compute the average difference between viewing times. In this case, the user has viewed, based on the viewing history, game 1, game 2, game 3 (the first content), and the documentary (the second content). The re-computed average may indicate that the user views a media asset associated with the sporting event type every 0.7 years. Since previously the computed average indicated that the user views a media asset associated with the sport event type every 1 year, the media guidance application may determine that the frequency has increased.

The media guidance application may search the database of education levels to identify a second sport education level associated with the increased frequency. Suppose that qualitatively, the frequency increased from "rarely" to "occasionally." As discussed previously, the user's education level may be "high school diploma." As a result, the media guidance application may search the database of education levels for the sports education level that intersects at the lookup table between "high school diploma" and the frequency "occasionally." Suppose that the intersection is the "intermediate" sports education level. The media guidance application may identify "intermediate" as the second education level. If the media guidance application is using a quantitative scale for education levels and frequency (e.g., a scale of 1-10), the media guidance application may convert "high school diploma" to a numerical value of 3. Likewise, the numerical counterpart of "occasionally" may be 5. Based on the lookup table, these values may intersect at a second sport education level of 5. In some embodiments, the media guidance application may use the numerical values as inputs in an algorithm which outputs an appropriate sport education level.

The media guidance application may then process metadata associated with the second content to identify the term detected in the first content. As mentioned previously, the media guidance application may process metadata by extracting subtitles or closed-captioning data to identify words that correspond to the sporting event type. The media guidance application may also utilize computer vision to identify metrics, terms and objects displayed in the content. Suppose that the media guidance application identifies the term "foul-ball" once again.

The media guidance application may then compare the second sport education level of the user to the threshold sport education level. Suppose that the user's second sport education level is intermediate. The threshold sport education level of the term "foul-ball" may be "beginner," as indicated in the sports database. Similarly, the quantitative counterpart of the threshold sport education level may be 4, and the user's second sport education level may be 5. As a result, the media guidance application may determine that the second sport education level is greater than the threshold sport education level.

In response to determining that the second sport education level of the user is greater than the threshold sport education level but less than a maximum threshold sport education level, the media guidance application may present a second explanation of the term to the user that is more advanced than the first explanation. In this case the maximum threshold sport education level may be 10 (e.g., quantitatively) or "expert" (e.g., qualitatively). The maximum threshold may represent the highest value of knowledge that can be achieved by a user in terms of the sporting event type. A user that has an "expert" sport education level may not need definitions of basic terms such as "foul-ball" or "homerun." In this example, the media guidance application may determine the user's second sport education level is greater than the threshold sport education level, but is less than a maximum threshold sport education level. The sports database may include multiple definitions/explanations for terms based on the sport education level of a user. For example, the definition for "foul-ball" presented to a user with a "beginner" sport education level may simply be "a ball that falls in a part of the field that is not considered fair." Alternatively, the sports database may provide the definition for "foul-ball" presented to a user with an "advanced" sport education level as "a ball that settles on foul territory between home and first base or between home and third base, or while on or over foul territory, touches the person of an umpire or player, or any object foreign to the natural ground."

In some embodiments, the media guidance application may provide the user with fun facts or trivia associated with the term. For example, the media guidance application may retrieve trivia questions and fun fact information from the Internet, or the sports database. If the media guidance application detects the term "foul-ball," the media guidance application may present a user with a sport education level equal to the maximum threshold sport education level with sports trivia such as "Did you know? Player X has the record for hitting the most foul-balls." In some embodiments, the media guidance application may determine that the user has a sport education level equal to the maximum threshold sport education level and request to the user to define a term for other users. For example, the media guidance application may ask the user if he/she is interested in providing an explanation or definition for a term, in order to improve the definitions in the sports database.

In some embodiments, presenting the explanation of the term to the user comprises of the media guidance application transmitting the term to a social network associated with the user. The social network may be any platform that allows users to communicate with each other by posting comments, images, videos, etc. (e.g., Facebook, Twitter, Reddit, etc.). The media guidance application may post the term detected "foul-ball" to a social network that the user is associated with, while requesting an explanation for the term. The media guidance application may then receive input from a plurality of users on the social network, each input providing a given explanation of the term. For example, three users may provide an explanation of "foul-ball." User 1 may post "a ball that lands past a boundary of the ballpark." User 2 may post "a ball that lands beyond the marked lines of the play field." User 3 may post "a ball that is not in the boundary of the playing field." The media guidance application may identify a set of the inputs from the plurality of users having explanations in common. For example, the media guidance application may identify words and their synonyms to determine similarities between the explanations posted. In this case, the media guidance application may identify a majority of the users start their explanations with "a ball that lands" and end with "the playing field." Furthermore, the media guidance application may recognize "past" and "beyond" as synonyms. The media guidance application may then generate the explanation of the term based on the set of the inputs. For example, based on the similarities of the posted explanations, the media guidance application may construct an explanation, which combines a set of inputs that are common, such as "a ball that lands beyond a boundary of the playing field."

In some embodiments, the media guidance application may directly select the explanation with a number of acknowledgments (e.g., likes, retweets, comments, etc.) greater than an acknowledgment threshold, as the explanation that will be displayed to users that come across the term while accessing content. For example, if user 2 received the 100 likes for an explanation that he/she gave, the media guidance application may refer to the user profile to retrieve the acknowledgment threshold (e.g., 50). In response to determining that the amount of acknowledgments the user's explanation received is greater than the acknowledgment threshold, the media guidance application may select the explanation, instead of generating a new one based on the set of inputs.

In some embodiments, the media guidance application may receive input from the user that identifies a set of experts on the social network for the given type of sporting event. For example, the media guidance application may identify other users that also use the media guidance application and have a sport education level equal to the maximum threshold sport education level. Alternatively, the media guidance application may identify individuals or companies (e.g., MLB, NBA, NHL, etc.) that are a part of the social network, and are associated with the sporting event type. For example, these individuals may be sports announcers, players, coaches, trainers, analysts, etc. Due to their direct association with the sport, the media guidance application may identify the individuals and companies as a set of experts. The media guidance application may prompt the user whether he/she wishes to confirm the experts identified by the media guidance application. If the user confirms the experts, the media guidance application may list the identified experts in an expert database. Whenever a user posts an explanation of a term on the social network, the media guidance application may cross reference the name/ username of the user with the expert database to determine whether the user is an expert of the sport. Each sport may have its own section in the expert database with different experts. The media guidance application may also limit transmission of the term to the identified set of experts. For example, the media guidance application may only consider the explanations from the experts when generating an explanation for the user based on the set of inputs that are common among each explanation posted on the social network. In some cases, the media guidance application may generate a social network profile, post a query for defining the term, and only allow experts to post on the profile with potential explanations.

In some embodiments, the media guidance application may detect display of a metric of the sporting event type in the currently accessed content. For example, during a baseball game, a player may be approaching home plate to bat. As a result, the player's batting statistics may appear on the display of the user. The media guidance application may identify the metrics by using computer vision (e.g., segmentation, edge detection, classification). It should be noted that content providers (e.g., FOX, ESPN) often place metrics in the same part of the screen for each game of a sport. For example, FOX may place a scoreboard on the top left part of the screen for every MLB baseball game. The content of the scoreboard may also be placed in the same positions (e.g., team name, followed by points of the team, followed by the inning number, etc.). When utilizing computer vision to classify numbers and words, the media guidance application may refer to a presentation database that includes pixel coordinates outlining the positions of various metrics and overlays generated by a content provider for a sporting event. The media guidance application may then limit its processing to those coordinates to identify metrics with more efficiency.

In response to identifying a display of a metric (e.g., a plurality of statistics), the media guidance application may modify the metric that is displayed based on the sport education level of the user. In some embodiments, modifying the metric comprises ranking the plurality of statistics based on an importance level associated with each statistic. Revisiting the previous example, when a player's batting statistics are shown on the screen, the metrics may include "batting average," "on-base percentage," "slugging percentage," and "on-base plus slugging percentage." The media guidance application may determine the importance of each statistic by referring to the sports database. The sports database may include a section that lists metrics associated with a sport type, and organizes them based on importance. Furthermore, each metric may have a threshold sport education level associated with it. The importance of a metric may be a pre-determined value (e.g., on a scale from 1-10 or a qualitative description such as "very important") by the sports organization associated with the sporting event type (e.g., MLB is associated with baseball). Suppose that the media guidance application ranks "batting average" as 1 (e.g., first-most important), "on-base percentage" as 2, "slugging percentage" as 3, and "on-base plus slugging percentage" as 4 (e.g., least-most important), based on the importance listed in the sports database.

In some embodiments, the media guidance application may determine the importance of a metric based on the frequency at which appears during a sporting event type. For example, the media guidance application may analyze previous media assets associated with the sporting event and count the number of references made to a specific metric. The media guidance application may then organize the list of metrics in the sports database based on the frequency of appearance of a metric.

The media guidance application may remove a first subset of the plurality of statistics being displayed that is associated with a rank greater than a first threshold rank, in response to determining that the first sport education level of the user is greater than the threshold sport education level and less than a maximum threshold sport education level. Suppose that the first threshold rank is 2, the user's first education level is 5, the threshold sport education level is 3, and the maximum threshold sport education level is 10. The media guidance application may determine that the user's first sport education level is greater than the threshold sport education level and is lower than the maximum threshold sport education level. This may mean that the user is familiar enough with the sport to understand a certain set of terms or metrics, but not perhaps the complex ones. It should be noted that the terms and metrics that appear more frequently may be marked with greater importance. Accordingly, the media guidance application may remove a first subset of the plurality of statistics that is associated with a rank lower than the first threshold rank. In this example, the media guidance application may remove "slugging percentage" and "on-base plus slugging percentage" from the display because they rank lower than the first threshold rank.

The media guidance application may also remove a second subset of the plurality of statistics being displayed that is associated with a rank lower than a second threshold rank in response to determining that the first sport education level of the user is less than the threshold sport education level, wherein the second threshold rank is greater than the first threshold rank, and wherein the second subset includes the first subset. For example, the user's sport education level may be 2 and the threshold sport education level may be 3. Therefore, the media guidance application may determine that the user's sport education level is lower than the threshold sport education level (e.g., the user is not fully familiar with the sport). The second threshold rank may be 1, a value greater than the first threshold rank. The media guidance application may therefore remove all metrics that rank below the second threshold rank. In this case, the second subset would therefore include "on-base percentage," "slugging percentage," and "on-base plus slugging percentage." It should be noted that "slugging percentage" and "on-base plus slugging percentage" were part of the first subset. Thus, the second subset includes the first subset. The user may also select to view all metrics, and prevent the media guidance application from removing metrics from display.

In some embodiments, in place of the removed metrics, the media guidance application may present trivia and fun facts to the user about the metrics that are still being displayed to the user. For example, the media guidance application may replace the section displaying "on-base percentage," "slugging percentage," and "on-base plus slugging percentage" with an overlay with trivia about "batting average" (e.g., "Did you know: Player X currently has the highest batting average in the league").

In some embodiments, metrics removed from the display may be sent to a second device of the user (e.g., smartphone, television, computer, etc.) by the media guidance application. The media guidance application of the second device may generate, for display, the removed metrics along with their respective explanations.

It should be noted that the systems, methods, apparatuses, and/or aspects described above may be applied to, or used in accordance with, other systems, methods, apparatuses, and/ or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
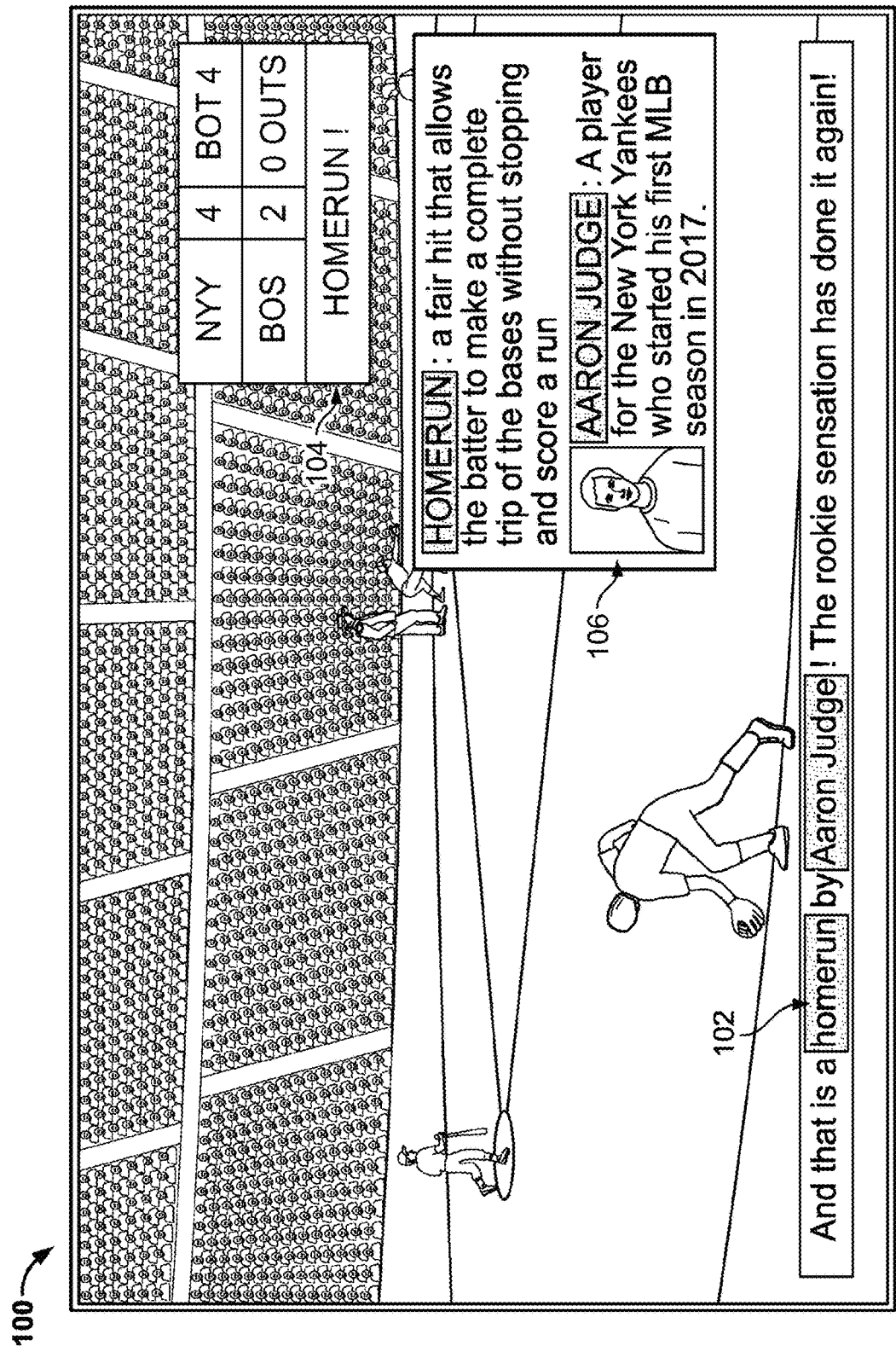
FIG. 1 is an illustrative example of a display screen for educating a user about terminology associated with a sporting event, in accordance with some embodiments of the disclosure.

Systems and methods are described to explain sports terminology to a user accessing content corresponding to a sporting event, based on his/her knowledge of the sport. For example, suppose that the user is watching a baseball game and a player in the game has hit a homerun. The media guidance application may determine that the user has never watched a baseball game and does not know much about baseball. As a result, the media guidance application may identify words that are either mentioned by the sports commentators, in closed-captioning, or on the display, such as "homerun," and define the words for the user. The media guidance application may generate for display, an overlay, that is presented to the user, with an explanation of the term. If the user accesses additional content corresponding to baseball in the future, the media guidance application may detect that the user has already been provided explanations of various terms such as "homerun," and either present a more advanced explanation of terms, or no explanation.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Consider a scenario in which a user is watching a baseball match featuring the New York Yankees and the Boston Red Sox on the FOX channel on his/her set top box. Furthermore, the user is unfamiliar with the sport and has not watched a baseball game before. As a result, the user may not understand the various metrics being displayed on the screen and the terms being used by the sports commentators. Suppose that the user sees one of the players from the New York Yankees, Aaron Judge, hit a homerun. The homerun may cause one of the sports commentators to say "And that is homerun by Aaron Judge. The rookie sensation has done it again." In addition, the word "Homerun" may be displayed in closed captioning and in an arbitrary portion of the display (e.g., center of the display or top left/right corner). As a response, the media guidance application may initiate a process to identify terms that need to be explained to the user.

FIG. 1 is an illustrative example of a display screen 100 for educating a user about terminology associated with a sporting event, in accordance with some embodiments of the disclosure. Closed-captioning 102 represents the transcribed commentary of the sports commentators. Score overlay 104 provides information such as game score, metrics and events of the game. Definitions overlay 106 provides explanations of the terms the media guidance application determines should be defined for the user, based on the user's familiarity with the sport.

The media guidance application may first detect that a user is currently accessing content corresponding to a sporting event of a given type. The media guidance application may retrieve channel metadata associated with FOX to determine what the user is viewing. Channel metadata, as generated by the content provider, may include information such as the media listings of the channel (e.g., the names of the television shows/movies broadcasted), respective content descriptions, and the content schedule (e.g., time stamps for each television show or movie). In this case, the media guidance application may determine that the name of the content the user is currently watching is "MLB Baseball: New York Yankees vs. Boston Red Sox," which has a description listed as "Major League Baseball season game between the New York Yankees and the Boston Red Sox." The media guidance application may retrieve a sports database that lists a variety of sports (e.g., baseball, basketball, tennis, etc.). The media guidance application may then search the name of the content, and/or the description, for a sport listed in the sports database. For example, the media guidance application may retrieve the term "baseball" from the sports database, search for "baseball" in the strings of the name and/or description, and determine that "baseball" is found in the string(s) (e.g., in the name of the content or in the description). Therefore, the media guidance application may detect that the user is currently accessing content corresponding to the sporting event type, baseball.

The media guidance application may then search, based on the given type of the sporting event type, a viewing history associated with the user to identify a plurality of media assets corresponding to sporting events of the given type. For example, the media guidance application may retrieve a user profile associated with the user that provides information such as the user's viewing history, content preferences, bookmarks, etc. The media guidance application may access the viewing history of the user to determine the media assets the user has viewed that correspond to the sport event detected. For example, the media guidance application may search for the term "baseball" in the metadata of the media assets (e.g., name, description) found in the viewing history. Suppose that the user has rarely watched baseball. The media guidance application may determine that the viewing history only has one media asset corresponding to baseball.

In some embodiments, the media guidance application may refer to a viewing threshold to determine a sport education level. The first sport education level may represent the level of knowledge a user has about a specific sport, and is used to determine whether certain terms should be explained to the user and how complicated the explanations can be. The viewing threshold may be the number of times a user has viewed a media asset corresponding to the sporting event type. Each sport education level may have a viewing threshold. For example, the sport education level may be a qualitative value (e.g., completely new, beginner, intermediate, advanced, expert, etc.) or a quantitative value (e.g., on a scale from 1-10). The viewing threshold for a "beginner" sport education level may be 2. The viewing threshold for an "expert" sport education level may be 100. This indicates that a user who has only viewed at least 2 media assets corresponding to baseball is generally unfamiliar with the sport type and therefore has a low sport education level. In contrast, a user that has viewed at least 100 media assets corresponding to baseball is familiar with the sport type and has a higher sport education level. In this case, since the user has only viewed one media asset corresponding to baseball, the media guidance application may determine that the sport education level of the user is "completely new."

The media guidance application may then process metadata associated with the currently accessed content to identify a plurality of terms describing the sporting event type. For example, the media guidance application may utilize closed-captioning information corresponding to the currently accessed content. For example, the media guidance application may determine that closed-captioning is available as it is displayed in closed-captioning 102 (FIG. 1) in the currently accessed content. The media guidance application may extract the closed-captioning data and identify words associated with the sporting event type. In the case that closed-captioning is not available, the media guidance application may also convert speech (e.g., sports commentary) in the currently accessed content to text using natural language processing (e.g., speech recognition). The media guidance application may also process visual information presented in the content as score overlay 104 (FIG. 1) to detect metrics of the sporting event type. For example, the media guidance application may utilize computer vision processes (e.g., segmentation, edge detection, classification) and natural language processing to identify visual information in the content. Suppose that a player hits a homerun in the baseball game. The word "Homerun" may appear on the screen. Furthermore, the score of the game may change accordingly. For example, the media guidance application may therefore use segmentation and classification to identify the visual "Homerun" in score overlay 104 and convert it into a word. The media guidance application may then search for the word in the sports database to determine whether the word and metrics correspond to "baseball."

The media guidance application may compare the identified plurality of terms with a list of terms associated with the given type of sporting event to detect a term of the plurality of terms that is unique to the given type of sporting event in the content. As depicted in FIG. 1, the closed-captioning or the commentary may include a quote "And that is a homerun by Aaron Judge! The rookie sensation has done it again!" The media guidance application may identify each word/phrase in the quote and determine the words/phrases that correspond solely to "baseball." The media guidance application may refer to the sports database to determine a list of terms that correspond to a sporting event. These words may include technical terms, player names, team names, events, etc. In this example, the media guidance application may determine that the sports database for "baseball" includes the list of terms "homerun," "Aaron Judge," and "rookie." Therefore, the words "homerun," "Aaron Judge," and "rookie" from the quote correspond to the sporting event type, baseball. Furthermore, the media guidance application may determine that the term "rookie" is not exclusive to "baseball" and is found in other sections of the sports database as well (e.g., basketball, football, etc.).

The media guidance application may then compare the sport education level of the user to a threshold sport education level. The threshold sport education level may be associated with the term that is unique to the sporting event type. For example, the sports database may include a column that assigns each term a threshold sporting event educational level. In terms of baseball, terms such as "homerun," or "Aaron Judge" may be assigned a threshold sport education level of "completely new," whereas "slugging percentage" may be assigned "advanced." This may be because a viewer who is just beginning to watch baseball may need some basic information to get acclimated to the sport, whereas someone who regularly watches baseball, may not need an explanation of the basic words and may prefer getting explanations about more complex aspects of the sport. Therefore, the media guidance application may determine that the first sport education level of the user is equal to the threshold sport education level.

In response to determining that the first sport education level of the user is less than or equal to the threshold sport education level, the media guidance application may present an explanation of the terms to the user while the user accesses the content. For example, the media guidance application may determine that the terms "homerun" and "Aaron Judge" have a threshold sport education level of "completely new," which matches the user's first sport education level. The media guidance application may then highlight the terms in closed-captioning 102 (FIG. 1) and generate for display to the user, definitions overlay 106 (FIG. 1), which includes all the identified terms and their respective definitions. In the case where a person is referenced, the media guidance application may also provide an image of the person. Depending on the sport education level of the user, the media guidance application may provide additional details about the terms. For example, if the user has an "advanced" sport education level, definitions overlay 106 may include statistics of Aaron Judge's performance or may include trivia about the player or term.

Figure 2:
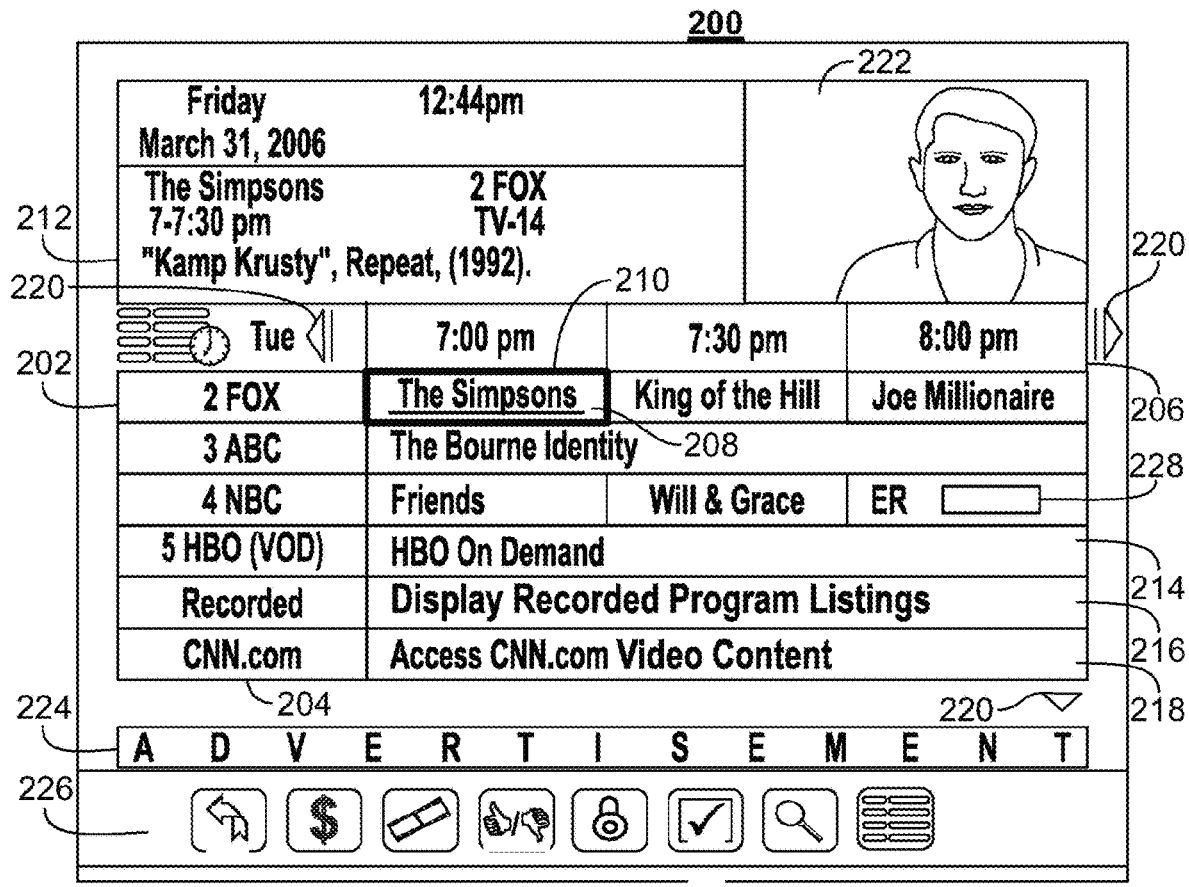
FIGS. 2 and 3 show illustrative examples of display screens generated by a media guidance application in accordance with some embodiments of the disclosure.
Figure 3:
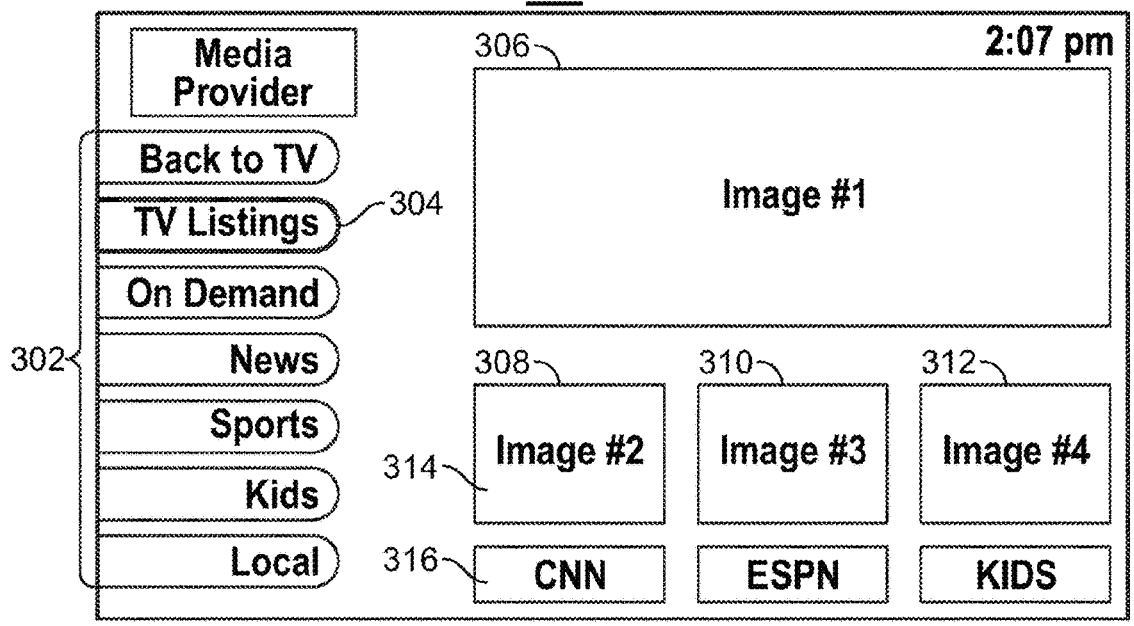

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
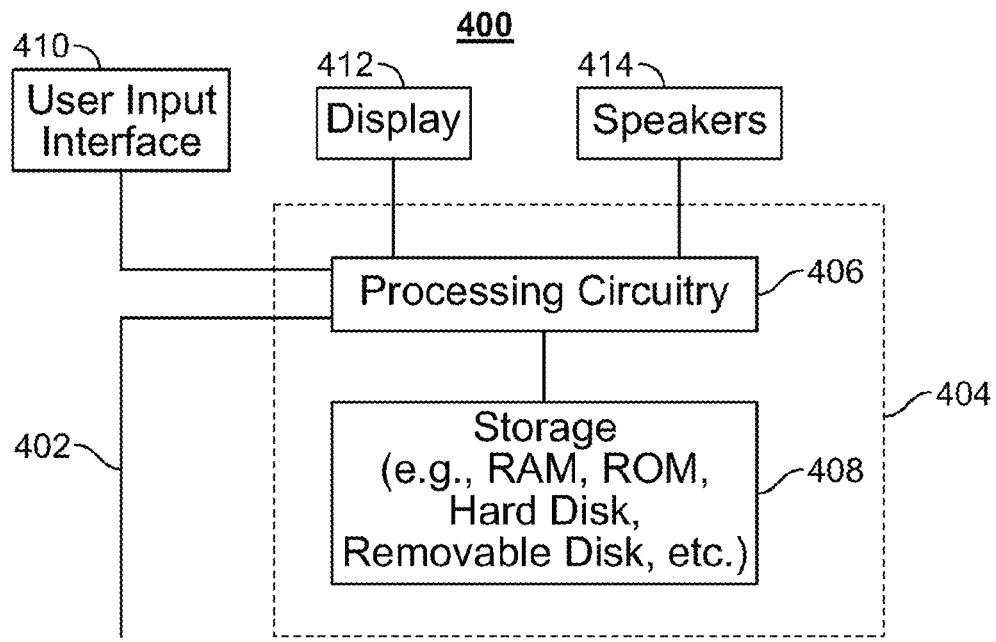
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
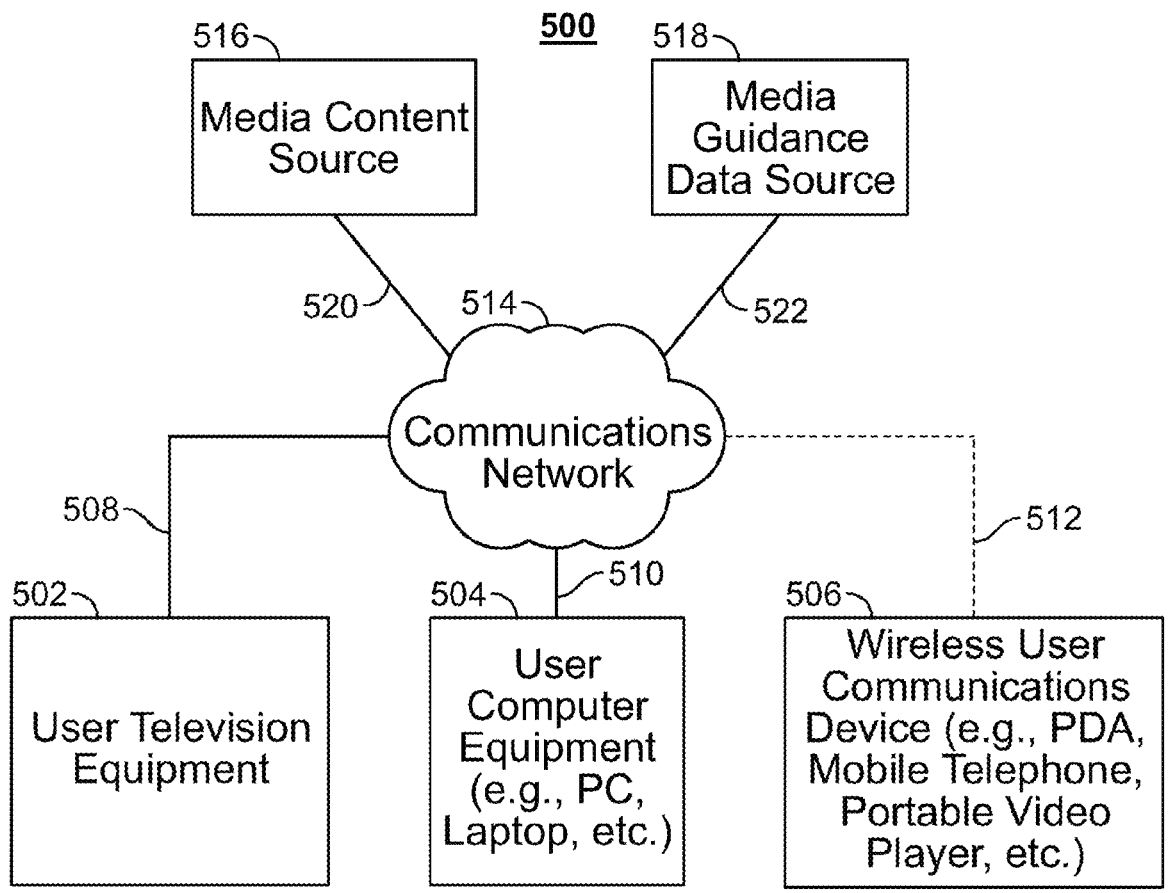
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
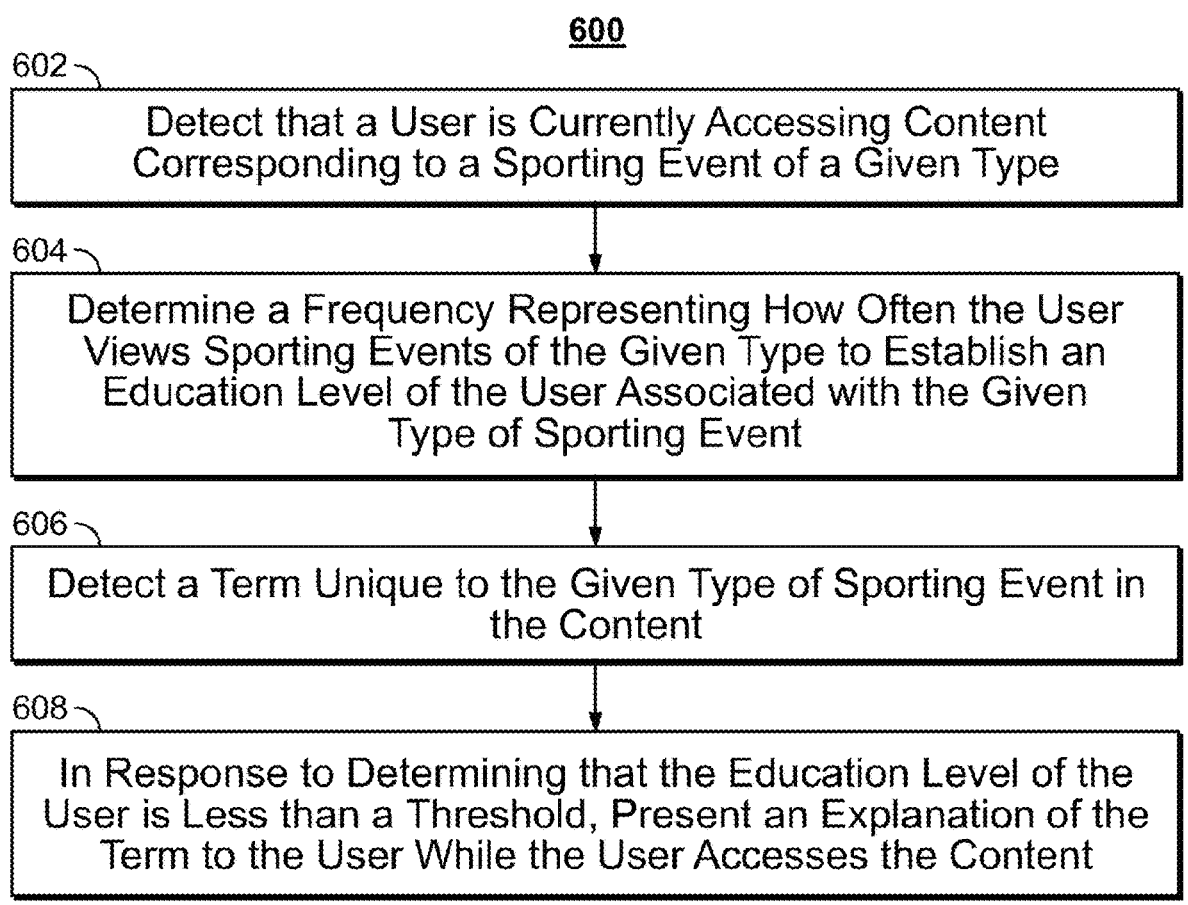
FIG. 6 is a flowchart of an illustrative process for educating a user about terminology associated with a sporting event, in accordance with some embodiments of the disclosure.

FIG. 6 is a flowchart of an illustrative process for educating a user about terminology associated with a sporting event, in accordance with some embodiments of the disclosure. It should be noted that process 600 or any step thereof could be performed on, or provided by, any of the devices shown in FIGS. 4-5. For example, process 600 may be executed by control circuitry 404 (FIG. 4) as instructed by a media guidance application implemented on a user device (e.g., user equipment devices 502, 504, and/or 506 (FIG. 5)) in order to educate a user about terminology associated with a sporting event. In addition, one or more steps of process 600 may be incorporated into or combined with one or more steps of any other process or embodiment (e.g., as described in relation to FIGS. 1 and 7-11).

At step 602, control circuitry 404 (FIG. 4) detects that a user is currently accessing content corresponding to a sporting event of a given type. Referring back to the overarching example in which the user is viewing a baseball game featuring the New York Yankees and the Boston Red Sox, control circuitry 404 may extract metadata from the media guidance data source 518 (FIG. 5) associated with the baseball game, such as the name and the description of the content, to search for references to a sport. Control circuitry 404 may specifically determine that the name of a sport (e.g., baseball) is found in the name or description of the content. Accordingly, control circuitry 404 may determine that the content is associated with the identified sporting event.

At step 604, control circuitry 404 (FIG. 4) determines a frequency representing how often the user views sporting events of the given type to establish an education level of the user associated with the given type of sporting event. For example, control circuitry 404 may refer to the viewing history of the user in storage 408 (FIG. 4) to identify media assets the user has previously viewed that correspond to the sporting event type. Suppose that control circuitry 404 identifies several media assets that the user previously accessed that correspond to baseball. Control circuitry 404 may determine the time of access for each media asset and determine a frequency value (e.g., accessed one per week, twice a month, etc.) based on the number of times the user accessed the media assets in a given period of time. Based on the frequency value, control circuitry 404 may use a lookup table in storage 408 to determine an education level of the user in terms of the sport. For example, control circuitry 404 may determine that the frequency of one time per day (e.g., the user views content associated with baseball on daily basis) indicates that the user has an "advanced" understanding of baseball. Therefore, the education level of the user may be "advanced" for baseball-related content.

At step 606, control circuitry 404 (FIG. 4) detects a term unique to the given type of sporting event in the content. Control circuitry 404 may actively monitor for terms by analyzing any closed-captioning data associated with the content, sports commentary audio, or visual ques such as an in-game overlay of metrics when a player comes to bat. The media guidance data source 518 (FIG. 5) may provide this information. Control circuitry 404 may utilize computer vision to process visual information, and natural language processing to identify words. For example, the user may be viewing a baseball game and the sports commentator may use the term "slugging percentage." Control circuitry 404 may first identify the term "slugging percentage" using the processes mentioned, and then use a lookup table to determine that the term is unique to the sporting event type, baseball.

At step 608, in response to determining that the education level of the user is less than a threshold, control circuitry 404 (FIG. 4) presents an explanation of the term on display 412 (FIG. 4) to the user while the user accesses the content. The threshold may be a value associated with the identified term. For example, the lookup table in storage 408 (FIG. 4) that indicates whether the term is unique to the sporting event type may also provide a definition of the term and a threshold that represents the maximum education level that requires an explanation of the term. Suppose that the user's education level is "advanced" and the threshold is "expert," a value greater than the user's education level. In response to determining that the user's education level is lower than the threshold, control circuitry 404 may determine that the term "slugging percentage" should be provided and may generate, for display, an explanation to the user as he/she views the content.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 6.

Figure 7:
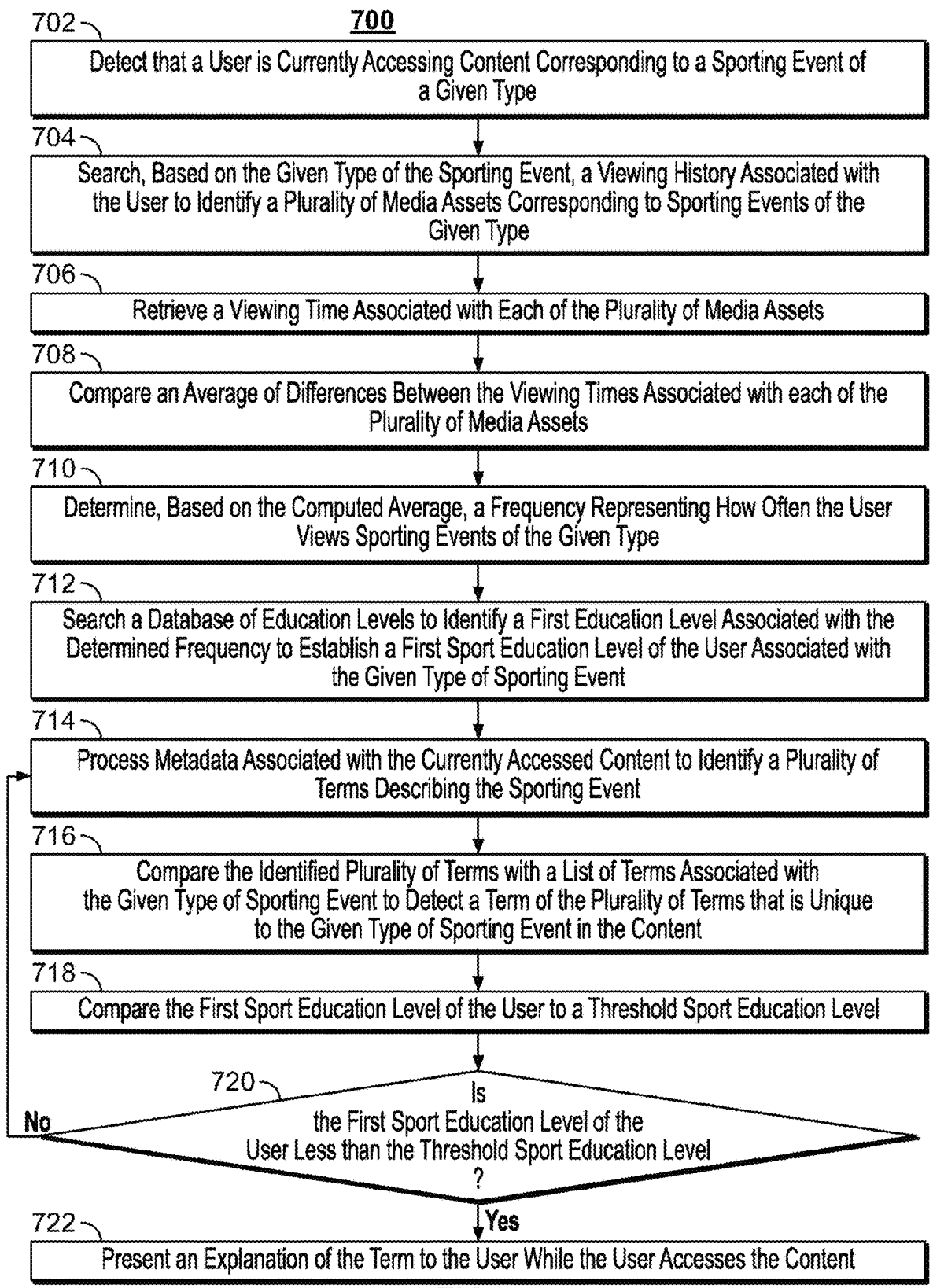
FIG. 7 is a flowchart of a detailed illustrative process for educating a user about terminology associated with a sporting event, in accordance with some embodiments of the disclosure

FIG. 7 is a flowchart of a detailed illustrative process for educating a user about terminology associated with a sporting event, in accordance with some embodiments of the disclosure. It should be noted that process 700 or any step thereof could be performed on, or provided by, any of the devices shown in FIGS. 4-5. For example, process 700 may be executed by control circuitry 404 (FIG. 4) as instructed by a media guidance application implemented on a user device (e.g., user equipment devices 502, 504, and/or 506 (FIG. 5)) in order to educate a user about terminology associated with a sporting event. In addition, one or more steps of process 700 may be incorporated into or combined with one or more steps of any other process or embodiment (e.g., as described in relation to FIGS. 1, 6 and 8-11).

At step 702, control circuitry 404 (FIG. 4) detects that a user is currently accessing content corresponding to a sporting event of a given type. The content may include at least one of a linear media asset (e.g., television broadcast of a sports event), an on-demand media asset (e.g., a recording of a sports documentary), and social chatter on a social platform associated with the user (e.g., sports forum or discussion). Control circuitry 404 may access the content from the media content source 516 (FIG. 5) on the user's device, such as user television equipment 502, user computer equipment 504, or a wireless communications device 506 (FIG. 5). Suppose that the user is accessing a sports documentary about Babe Ruth, an iconic baseball player. Control circuitry 404 may retrieve metadata from the media guidance data source 518 (FIG. 5) associated with the documentary to determine what the user is viewing. The metadata, as generated by the content provider, may include information such as the content's name, description, transmission time, year of production, etc. In this case, control circuitry 404 may determine that the name of the content the user is currently watching is "Babe Ruth: A Look into the Life of Baseball's Finest," which has a description listed as "a through biography of the New York Yankees legend, focusing on the iconic baseball player's career." Control circuitry 404 may retrieve a sports database from storage 408 (FIG. 4) that lists a variety of sports (e.g., baseball, basketball, tennis, etc.). Control circuitry 404 may then search the name of the content, and/or the description, for a sport listed in the sports database. For example, control circuitry 404 may retrieve the term "baseball" from the sports database, search for "baseball" in the strings of the name and/or description, and determine that "baseball" is found in the string(s) (e.g., in the name of the content or in the description). Thus, control circuitry 404 detects that the user is currently accessing content corresponding to the sporting event type, baseball.

At step 704, control circuitry 404 (FIG. 4) searches, based on the given type of the sporting event type, a viewing history associated with the user, to identify a plurality of media assets corresponding to sporting events of the given type. For example, control circuitry 404 may retrieve a user profile associated with the user from storage 408 (FIG. 4) that provides information such as the user's viewing history, content preferences, bookmarks, etc. Control circuitry 404 may access the viewing history of the user to determine the media assets the user has viewed that correspond to the sport event detected. For example, control circuitry 404 may search for the term "baseball" in the metadata of the media assets (e.g., name, description) found in the viewing history. Suppose that the user has rarely watched baseball. Control circuitry 404 may determine that the viewing history only has three instances of media assets corresponding to baseball.

At step 706, control circuitry 404 (FIG. 4) retrieves a viewing time associated with each of the plurality of media assets. For example, the viewing history in storage 408 (FIG. 4) may also list time stamps of the times the user viewed the media assets. Consider the three media assets corresponding to baseball: game 1, game 2, and the documentary currently being accessed. Control circuitry 404 may determine the viewing times, based on the metadata of the media assets, as Oct. 2, 2015 at 5:00 pm, Oct. 2, 2016 at 6:00 pm, and Oct. 2, 2017 at 5:30 pm, respectively.

At step 708, control circuitry 404 (FIG. 4) compares an average of differences between the viewing times associated with each of the plurality of media assets. For example, control circuitry 404 may first determine the difference between the three media assets mentioned previously. The difference between the viewing time of game 1 and game 2 is one year and the difference between game 2 and the documentary is one year. Therefore, control circuitry 404 may determine that the average of differences between media assets is one year.

At step 710, control circuitry 404 (FIG. 4) determines, based on the computed average, a frequency representing how often the user views sporting events of the given type. The frequency may be a quantitative (e.g., 5 times per week, 10 times per month, etc.) or a qualitative value (e.g., often, very often, rarely, etc.). For example, control circuitry 404 may determine that the average difference between the media asset viewing times is one year. Therefore, the user watches media assets corresponding to baseball once a year. If control circuitry 404 relies on a qualitative frequency, control circuitry 404 may determine classifications of various numerical values. For example, the frequency 1 times per week may be classified as "not often," 3 times per week may be classified as "average," 5 times per week may be classified as "often," etc. In this case, control circuitry 404 may determine the frequency to be $\frac{1}{52}$ times per week, which control circuitry 404 may classify as "rarely." The user may select whether control circuitry 404 should use qualitative values or quantitative values through I/O Path 402 (FIG. 4). Control circuitry 404 may store the user's selection in the user profile in storage 408 (FIG. 4).

At step 712, control circuitry 404 (FIG. 4) searches a database of education levels to identify a first education level associated with the determined frequency to establish a first sport education level of the user associated with the given type of sporting event. The first sport education level may represent the level of knowledge a user has about a specific sport, and is used to determine whether certain terms should be explained to the user and how complicated the explanations can be. The database of education levels may be a lookup table (e.g., array of strings) in storage 408 (FIG. 4) that lists education levels (e.g., some high school, high school diploma, some college, associate degree, bachelor degree, etc.) in separate rows and the frequency (e.g., rarely, average, often, etc.) in separate columns. The intersection of an education level and the frequency may indicate the first sport education level (e.g., completely new, beginner, intermediate, advanced, expert, etc.). For example, the intersection of "bachelor degree" and "often" may indicate that the user has an "advanced" first sport education level. Control circuitry 404 may determine the first education level of the user by requesting user input of the education level, or referring to social media (e.g., education field of user's Facebook profile) over the Internet. Suppose that the user profile in storage 408 indicates that the user's first education level is "high school diploma." The frequency, as determined by control circuitry 404, is "rarely." Control circuitry 404 may use these inputs to look up the user's first sport education level. Based on the database of education levels, control circuitry 404 may determine that the user has a "beginner" first sport education level.

At step 714, control circuitry 404 (FIG. 4) processes metadata associated with the currently accessed content to identify a plurality of terms describing the sporting event type. Control circuitry 404 may actively monitor for terms by analyzing any closed-captioning data associated with the content, sports commentary audio, or visual ques such as an in-game overlay of metrics when a player comes to bat. The media guidance data source 518 (FIG. 5) may provide this information. Control circuitry 404 may utilize computer vision to process visual information, and natural language processing to identify words. For example, in the documentary being watched by the user, the narrator may say "Babe Ruth is synonymous with homeruns." Control circuitry 404 (FIG. 4) may either retrieve these words from the subtitles of the documentary, or utilize speech recognition to transcribe the quote. This process is discussed in greater detail in the description of FIG. 9.

At step 716, control circuitry 404 (FIG. 4) compares the identified plurality of terms with a list of terms associated with the given type of sporting event to detect a term of the plurality of terms that is unique to the given type of sporting event in the content. For example, the closed-captioning or the commentary may include a quote "Babe Ruth is synonymous with homeruns." Upon converting the speech to text, control circuitry 404 (FIG. 4) may identify each word/phrase in the quote and determine the words/phrases that correspond solely to "baseball." Control circuitry 404 may refer to the sports database in storage 408 (FIG. 4) to determine a list of terms that correspond to a sporting event. These words may include technical terms, player names, team names, events, etc. In this example, control circuitry 404 may determine that the sports database for "baseball" includes the list of terms "Babe Ruth," and "homeruns," which are also found in the quote. Therefore, the words "Babe Ruth" and "homeruns" from the quote correspond to the sporting event type, baseball. Furthermore, control circuitry 404 may determine that the terms "Babe Ruth" and "homerun" are exclusive to "baseball" since they are not found in other sections of the sports database. In some embodiments, the sports database may feature an additional column that indicates whether a term is unique to the sport or the term's definition is unique to the sport (e.g., to account for sports that use similar terms with different definitions).

At step 718, control circuitry 404 (FIG. 4) compares the first sport education level of the user to a threshold sport education level. The threshold sport education level may be retrieved from storage 408 (FIG. 4) and is associated with the term that is unique to the sporting event type. For example, the sports database may include a column that assigns each term a threshold sporting event educational level. In terms of baseball, terms such as "Babe Ruth," and "homerun," may be assigned a threshold sport education level of "beginner," whereas "slugging percentage" may be assigned "advanced." In this example, control circuitry 404 may determine that the first sport education level of the user is equal to the threshold sport education level. It should be noted that the threshold sport education level may also be a quantitative value. For example, the education levels may be ranked in a 1-10 scale where 1 represents a minimum education level and 10 represents the highest education level. Similarly, the threshold level may also be ranked in a scale from 1-10. Suppose that the sporting event type education of the user is 3 and the threshold sport education level for the terms "Babe Ruth" and "homerun" is 4, control circuitry 404 may determine that the user's first sport education level is less than the threshold sport education level.

At step 720, control circuitry 404 (FIG. 4) determines whether the first sport education level of the user is less than or equal to the threshold sport education level. In the case where the first sport education level is greater than the threshold sport education level, the process returns to step 714 and control circuitry 404 continues to process metadata (e.g., subtitles, visuals, audio, etc.) for new terms that are unique to the sporting event type. In response to determining that the first sport education level of the user is less than or equal to the threshold sport education level, the process advances to step 722.

At step 722, control circuitry 404 (FIG. 4) presents an explanation of the term to the user while the user accesses the content. For example, control circuitry 404 may determine that the terms "Babe Ruth" and "homerun" have a threshold sport education level of "beginner," which matches the user's first sport education level. Likewise, if control circuitry 404 is using quantitative representations of the education and threshold levels, control circuitry 404 may determine that the user's first sport education level is less than the threshold sport education level. In response, control circuitry 404 may retrieve a definition of the terms "Babe Ruth" and "homerun" from the sports database, or from the Internet. control circuitry 404 may then present an explanation of the terms on display 412. In some embodiments, presenting the explanation of the term comprises at least one of replacing a display of the term with the explanation, presenting an overlay over the content with the explanation adjacent to the term, highlighting the term in a display, or sending the explanation to a second screen device. For example, control circuitry 404 may highlight the term "Babe Ruth" and "homerun" in the closed-captioning (e.g., depicted similarly in closed captioning overlay 102 in FIG. 1) and generate an overlay that defines the term (e.g., depicted similarly in definitions overlay 106 in FIG. 1). Alternatively, the user may replace the terms "Babe Ruth" and "homerun" in the closed-captioning with their respective definitions/explanations. If the user is listening to an audio version of the sporting event type (e.g., on the radio), control circuitry 404 may also dictate the explanation of the term to the user through I/O Path 402 (FIG. 4). In some embodiments, control circuitry 404 may use speech recognition to wait for a portion of the audio when no sports commentary is taking place to dictate the explanation of the term. Control circuitry 404 may also communicate with another device on the user's network over communications network 514 (FIG. 5). Upon identifying a second device (e.g., user television equipment 502, user computer equipment 504, or wireless user communications device 506), control circuitry 404 may send the explanation to the second device in order to generate, for display, the explanation for the user.

It is contemplated that the steps or descriptions of FIG. 7 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 7.

Figure 8:
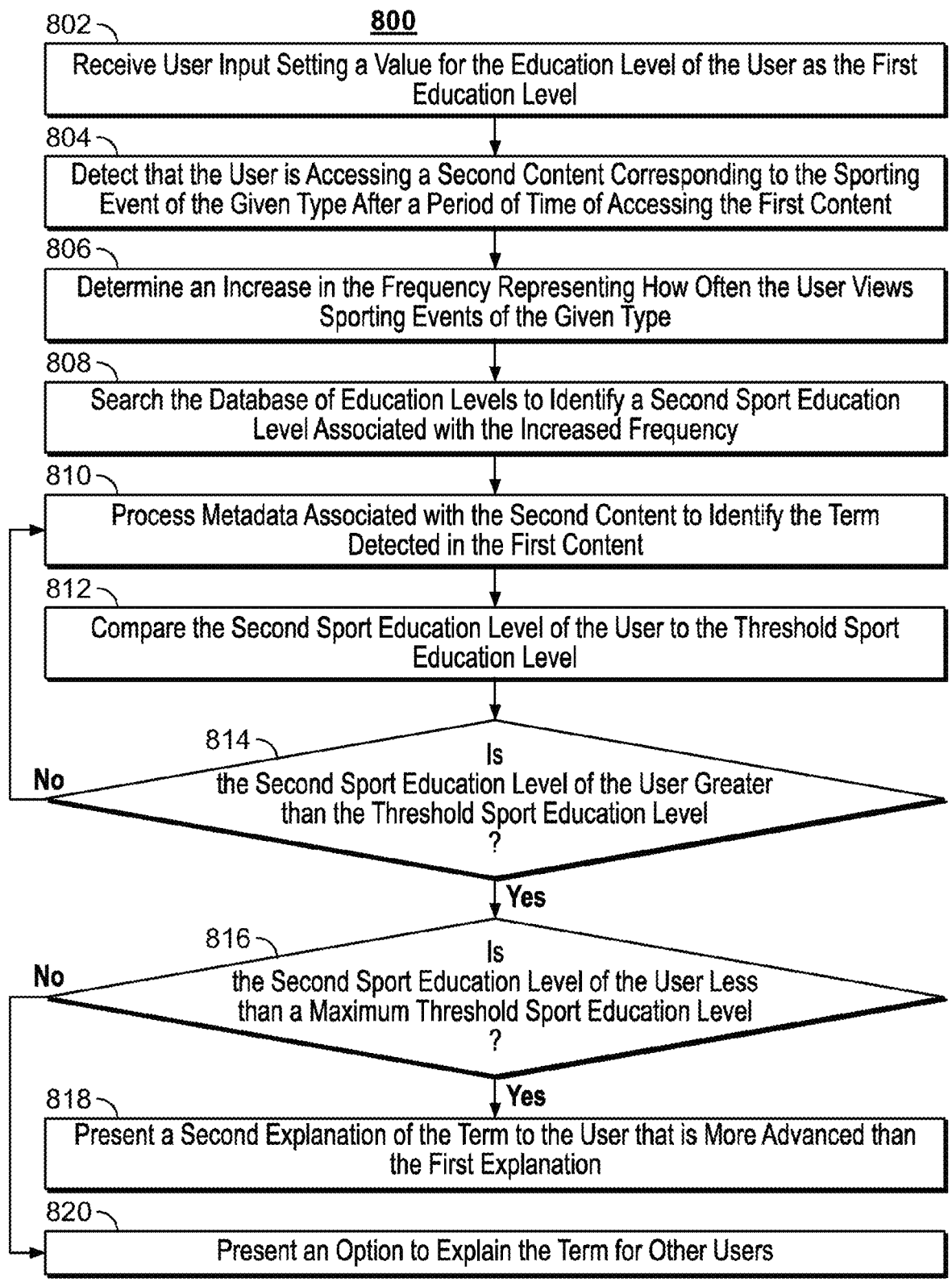
FIG. 8 is a flowchart of a detailed illustrative process for presenting a second explanation of a term to the user that is more advanced than the first explanation, in accordance with some embodiments of the disclosure.

FIG. 8 is a flowchart of a detailed illustrative process for presenting a second explanation of a term to the user that is more advanced than the first explanation, in accordance with some embodiments of the disclosure. It should be noted that process 800 or any step thereof could be performed on, or provided by, any of the devices shown in FIGS. 4-5. For example, process 800 may be executed by control circuitry 404 (FIG. 4) as instructed by a media guidance application implemented on a user device (e.g., user equipment devices 502, 504, and/or 506 (FIG. 5)) in order to present a second explanation of a term to the user that is more advanced than the first explanation. In addition, one or more steps of process 800 may be incorporated into or combined with one or more steps of any other process or embodiment (e.g., as described in relation to FIGS. 1, 6-7 and 9-11).

At step 802, control circuitry 404 (FIG. 4) receives user input setting a value for the education level of the user as the first education level. For example, control circuitry 404 may generate an overlay on display 412 (FIG. 4) with options for education levels (e.g., some high school, high school diploma, associate degree, etc.). The user may indicate over I/O Path 402, that he/she has an education level "high school diploma." This indicates that the user has completed high school. Accordingly, when generating explanations, control circuitry 404 may use vocabulary that a high school graduate can comprehend. If the user indicated an education level "masters degree," control circuitry 404 would provide more advanced explanations to sports terminology. Control circuitry 404 may store the value set by the user in the user profile in storage 408.

At step 804, control circuitry 404 (FIG. 4) detects that the user is accessing a second content corresponding to the sporting event type of the given type after a period of time of accessing the first content. For example, the user may access an on-demand media asset such as a second sports documentary about the New York Yankees, a MLB baseball team. Control circuitry 404 may retrieve metadata associated with the second content from the content provider and determine whether the name or description correspond to a sport in the sports database. In this case, control circuitry 404 may determine that the second content has metadata that references the terms "baseball" and "New York Yankees," which are terms found in the "baseball" section of the sports database. Therefore, control circuitry 404 may determine that the second content corresponds to the sporting event type, baseball. Furthermore, control circuitry 404 may retrieve the viewing history of the user from his/her user profile in storage 408 (FIG. 4) to determine the viewing time of the first content. Suppose that the user accessed the first content on Oct. 2, 2017. The user may be accessing the second content on Nov. 2, 2017. Thus, the period of time between the viewing time of the first content and the viewing time of the second content is one month.

At step 806, control circuitry 404 (FIG. 4) determines an increase in the frequency representing how often the user views sporting events of the given type. For example, control circuitry 404 may determine, based on the viewing times of the first content and the second content, that the viewing time difference is one month. In comparison, the average difference previously computed by control circuitry 404 was one year. Therefore, control circuitry 404 may detect an increase in the frequency (e.g., the user is accessing content related to the sporting event type more frequently). Alternatively, the media guidance application may re-compute the average difference between viewing times. In this case, the user has viewed, based on the viewing history, game 1, game 2, the documentary (the first content), and the second documentary (the second content). The re-computed average may indicate that the user views a media asset associated with the sporting event type every 0.7 years. Since previously the computed average indicated that the user views a media asset associated with the sport event every 1 year, control circuitry 404 may determine that the frequency has increased.

At step 808, control circuitry 404 (FIG. 4) searches the database of education levels to identify a second sport education level associated with the increased frequency. Suppose that qualitatively, the frequency increased from "rarely" to "occasionally." As discussed previously, the user's education level may be "high school diploma." As a result, control circuitry 404 may search the database of education levels for the sports education level that intersects at the lookup table between "high school diploma" and the frequency "occasionally." Suppose that the intersection is the "intermediate" sports education level. Control circuitry 404 may identify "intermediate" as the second education level. If control circuitry 404 is using a quantitative scale for education levels and frequency (e.g., a scale of 1-10), control circuitry 404 may convert "high school diploma" to a numerical value of 3. Likewise, the numerical counterpart of "occasionally" may be 5. Based on the lookup table, these values may intersect at a second sport education level of 5. In some embodiments, control circuitry 404 may use the numerical values as inputs in an algorithm which outputs an appropriate sport education level.

At step 810, control circuitry 404 (FIG. 4) processes metadata associated with the second content to identify the term detected in the first content. As mentioned previously, control circuitry 404 may process metadata by extracting subtitles or closed-captioning data to identify words that correspond to the sporting event type. Control circuitry 404 may also utilize computer vision to identify metrics, terms and objects displayed in the content. This is discussed in greater detail in the description of FIG. 9. Suppose that control circuitry 404 identifies the term "homerun" once again.

At step 812, control circuitry 404 (FIG. 4) compares the second sport education level of the user to the threshold sport education level. Suppose that the user's second sport education level is "intermediate," as determined by control circuitry 404. The threshold sport education level of the term "homerun" may be "beginner," as indicated in the sports database in storage 408 (FIG. 4). Similarly, the quantitative counterpart of the threshold sport education level may be 4, and the user's second sport education level may be 5.

At step 814, control circuitry 404 (FIG. 4) determines whether the second sport education level of the user is greater than the threshold sport education level. As indicated in the previous step, the threshold sport education level "beginner" is less than the second sport education level "intermediate." If control circuitry 404 determined otherwise, the process would return to step 810 and control circuitry 404 would continue to monitor audio, visuals, and metadata, for terms that are unique to the sport.

At step 816, in response to determining that the second sport education level of the user is greater than the threshold sport education level, control circuitry 404 (FIG. 4) determines whether the second sport education level of the user is less than a maximum threshold sport education level. In this case, the maximum threshold sport education level may be 10 (e.g., quantitatively) or "expert" (e.g., qualitatively) and is therefore greater than the user's second sport education level. The maximum threshold may represent the highest value of knowledge that can be achieved by a user in terms of the sporting event type. A user that has an "expert" sport education level may not need definitions of basic terms such as "Babe Ruth" or "homerun."

At step 818, in response to determining that the second sport education level of the user is greater than the threshold sport education level but less than a maximum threshold sport education level, control circuitry 404 (FIG. 4) presents a second explanation of the term to the user that is more advanced than the first explanation. The sports database in storage 408 (FIG. 4) may include multiple definitions/explanations for terms based on the sport education level of a user. For example, the definition for "Babe Ruth" presented to a user with a "beginner" sport education level may simply be "a famous baseball player most well-known for his time with the New York Yankees." Alternatively, the sports database may provide the definition for "Babe Ruth" presented to a user with an "advanced" sport education level as "an iconic baseball player, recognized in the MLB Hall of Fame, who is known for excellent pitching and hitting—an uncommon duo."

At step 820, control circuitry 404 (FIG. 4) presents the user with an option to explain the terms/metrics for other users in response to determining that the user's second sport education level is not less than the maximum threshold sport education level. In this case, control circuitry 404 may classify the user as an expert in the sport. Accordingly, control circuitry 404 may generate an option on display 412 (FIG. 4) allowing the user to choose whether he/she wants to provide an explanation of the term/metric for other users that may access the content. If the user accepts to provide an explanation, control circuitry 404 may generate a user input interface 410 (FIG. 4) that allows the user to enter an explanation. Control circuitry 404 then collects the user's explanation and may advance to step 1006 in FIG. 10.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 8.

Figure 9:
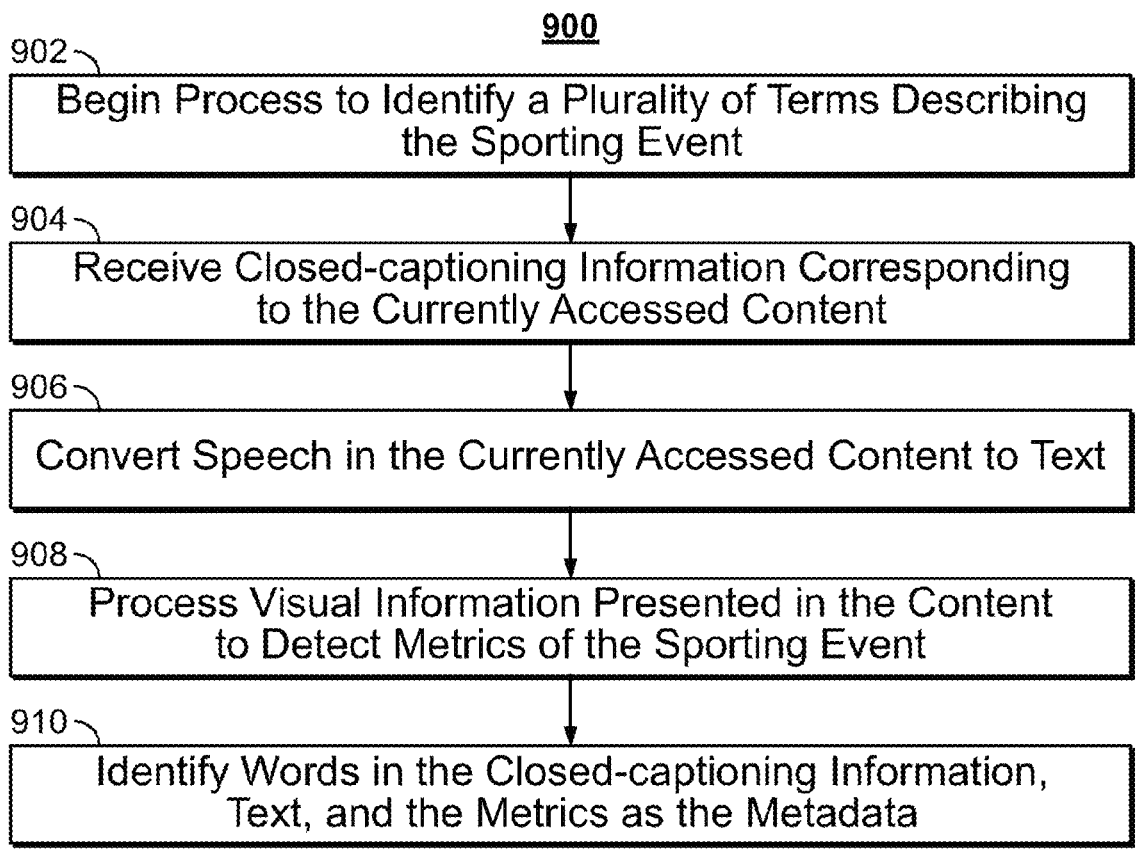
FIG. 9 is a flowchart of a detailed illustrative process for processing metadata to identify a plurality of terms describe the sporting event type, in accordance with some embodiments of the disclosure.

FIG. 9 is a flowchart of a detailed illustrative process for processing metadata to identify a plurality of terms describe the sporting event type, in accordance with some embodiments of the disclosure. It should be noted that process 900 or any step thereof could be performed on, or provided by, any of the devices shown in FIGS. 4-5. For example, process 900 may be executed by control circuitry 404 (FIG. 4) as instructed by a media guidance application implemented on a user device (e.g., user equipment devices 502, 504, and/or 506 (FIG. 5)) in order to process metadata to identify a plurality of terms describe the sporting event type. In addition, one or more steps of process 900 may be incorporated into or combined with one or more steps of any other process or embodiment (e.g., as described in relation to FIGS. 1, 6-8 and 10-11).

At step 902, control circuitry 404 (FIG. 4) begins the process of identifying a plurality of terms that describe the sporting event type. For example, if the user is viewing a live baseball game, control circuitry 404 may determine whether closed-captioning is available and may also retrieve information about the layout the content provider uses for placing metrics and overlays on the screen. Control circuitry 404 may thus identify the plurality of terms in real-time. If the user is simply accessing on-demand content that was previously recorded, control circuitry 404 may scan the entire content to identify terms before the user even reaches the term during playback.

At step 904, control circuitry 404 (FIG. 4) receives closed-captioning information corresponding to the currently accessed content. For example, control circuitry 404 (FIG. 4) may determine that closed-captioning is available in the currently accessed content. Control circuitry 404 (FIG. 4) may extract the closed-captioning data and identify words associated with the sporting event type. For example, closed-captioning may provide quotes to control circuitry 404 such as "Babe Ruth's base-hit was during the World Series was crucial." Control circuitry 404 may parse the quote into separate words/phrases and cross reference them with the sports database in storage 408 (FIG. 4) (e.g., performed in FIG. 7, step 716).

At step 906, control circuitry 404 (FIG. 4) converts speech (e.g., sports commentary) in the currently accessed content to text using natural language processing (e.g., speech recognition). For example, the content may not have closed-captioning information associated with it. As a result, when the narrator says "Babe Ruth's base-hit was during the World Series was crucial," control circuitry 404 may transcribe the quote, separate the words/phrases and cross reference them with the sports database in storage 408 (FIG. 4) (e.g., performed in FIG. 7, step 716).

At step 908, control circuitry 404 (FIG. 4) processes visual information presented in the content to detect metrics of the sporting event type. For example, control circuitry 404 may utilize computer vision processes (e.g., segmentation, edge detection, classification) and natural language processing to identify visual information in the content. It should be noted that content providers (e.g., FOX, ESPN) often place metrics in the same part of the screen for each game of a sport. For example, FOX may place a scoreboard on the top left part of the screen for every MLB baseball game. The content of the scoreboard may also be placed in the same positions (e.g., team name, followed by points of the team, followed by the inning number, etc.). When utilizing computer vision to classify numbers and words, control circuitry 404 may refer to a presentation database in storage 408 (FIG. 4) that includes pixel coordinates outlining the positions of various metrics and overlays generated by a content provider for a sporting event. Control circuitry 404 may then limit its processing to those coordinates to identify metrics with more efficiency. Using this approach for example, control circuitry 404 may process visuals such as the term "Homerun" appearing on the display and overlays including Babe Ruth's batting percentages. If information is not available in the presentations database for a particular content provider, control circuitry 404 may consider the entire display while running computer vision processes.

At step 910, control circuitry 404 (FIG. 4) identifies words in the closed-captioning information, text, and the metrics as the metadata. For example, control circuitry 404 may gather all of the words/metrics identified through the various processes described previously (e.g., computer vision, speech recognition, etc.) and identify them as the metadata. If the content was previously recorded, control circuitry 404 may scan the entire content for terms and also list the points at which the word/metric was mentioned (e.g., "homerun" mentioned 1 minute 23 second into the content). Control circuitry 404 may store this information alongside the metadata of the content in storage 408 (FIG. 4).

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 9.

Figure 10:
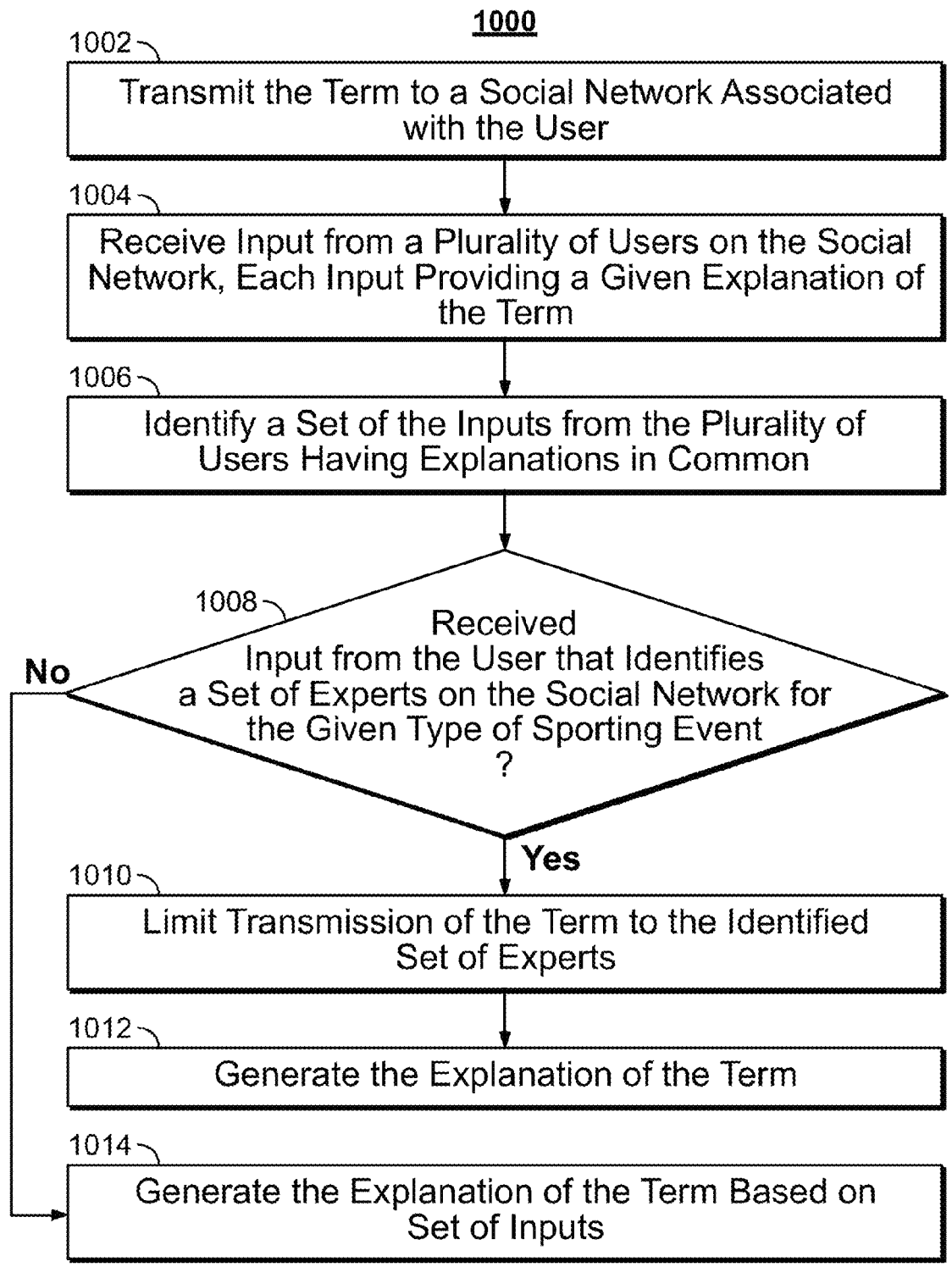
FIG. 10 is a flowchart of a detailed illustrative process for generating the explanation of the term based on set of inputs from a social network, in accordance with some embodiments of the disclosure.

FIG. 10 is a flowchart of a detailed illustrative process for generating the explanation of the term based on set of inputs from a social network, in accordance with some embodiments of the disclosure. It should be noted that process 1000 or any step thereof could be performed on, or provided by, any of the devices shown in FIGS. 4-5. For example, process 1000 may be executed by control circuitry 404 (FIG. 4) as instructed by a media guidance application implemented on a user device (e.g., user equipment devices 502, 504, and/or 506 (FIG. 5)) in order to generate the explanation of the term based on set of inputs from a social network. In addition, one or more steps of process 1000 may be incorporated into or combined with one or more steps of any other process or embodiment (e.g., as described in relation to FIGS. 1, 6-9 and 11).

At step 1002, control circuitry 404 (FIG. 4) transmits the term to a social network associated with the user. The social network may be any platform that allows users to communicate with each other by posting comments, images, videos, etc. (e.g., Facebook, Twitter, Reddit, etc.) on the Internet. Control circuitry 404 may post the term detected "foul-ball" to a social network that the user is associated with, while requesting an explanation for the term. For example, control circuitry 404 may refer to the user profile to determine the social media accounts the user has.

At step 1004, control circuitry 404 (FIG. 4) receives input from a plurality of users on the social network through I/O Path 402 (FIG. 4), each input providing a given explanation of the term. For example, three users may provide an explanation of "foul-ball." User 1 may post "a ball that lands past a boundary of the ballpark." User 2 may post "a ball that lands beyond the marked lines of the play field." User 3 may post "a ball that is not in the boundary of the playing field."

At step 1006, control circuitry 404 (FIG. 4) identifies a set of the inputs from the plurality of users having explanations in common. For example, control circuitry 404 may identify words and their synonyms to determine similarities between the explanations posted. In this case, control circuitry may identify a majority of the users start their explanations with "a ball that lands" and end with "the playing field." Furthermore, control circuitry 404 may recognize "past" and "beyond" as synonyms based on dictionaries available from the Internet.

At step 1008, control circuitry 404 (FIG. 4) determines whether input from the user that identifies a set of experts on the social network for the given type of sporting event has been received. For example, control circuitry 404 may identify other users that also use the media guidance application and have a sport education level equal to the maximum threshold sport education level. Alternatively, control circuitry 404 may identify individuals or companies (e.g., MLB, NBA, NHL, etc.) that are a part of the social network, and are associated with the sporting event type. For example, these individuals may be sports announcers, players, coaches, trainers, analysts, etc. Due to their direct association with the sport, the media guidance application may identify the individuals and companies as a set of experts. Control circuitry 404 may prompt the user whether he/she wishes to confirm the experts identified by control circuitry 404. If the user chooses not to confirm the experts, the process may advance to step 1114. In contrast, if the user confirms the experts using I/O Path 402 (FIG. 4), control circuitry 404 may list the identified experts in an expert database in storage 408 (FIG. 4). Whenever a user posts an explanation of a term on the social network, control circuitry 404 may cross reference the name username of the user with the expert database to determine whether the user is an expert of the sport. Each sport may have its own section in the expert database with different experts.

At step 1010, control circuitry 404 (FIG. 4) limits transmission of the term to the identified set of experts. For example, control circuitry 404 may only consider the explanations from the experts when generating an explanation for the user based on the set of inputs that are common among each explanation posted on the social network. In some cases, control circuitry 404 may generate a social network profile, post a query for defining the term, and only allow experts to post on the profile with potential explanations.

At step 1112, control circuitry 404 (FIG. 4) generates the explanation of the term based on the set of inputs from the experts. At step 1114, control circuitry 404 generates the explanation of the term based on the set of the inputs of all users that answered. In each case, the generation process is the same. For example, based on the similarities of the posted explanations, control circuitry 404 may construct an explanation, which combines a set of inputs that are common, such as "a ball that lands beyond a boundary of the playing field." In some embodiments, control circuitry 404 may directly select the explanation with a number of acknowledgments (e.g., likes, retweets, comments, etc.) greater than an acknowledgment threshold, as the explanation that will be displayed to users that come across the term while accessing content. For example, if user 2 received the 100 likes for an explanation that he/she gave, control circuitry 404 may refer to the user profile in storage 408 (FIG. 4) to retrieve the acknowledgment threshold (e.g., 50). In response to determining that the amount of acknowledgments the user's explanation received is greater than the acknowledgment threshold, control circuitry 404 may select the explanation, instead of generating a new one based on the set of inputs.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 10.

Figure 11:
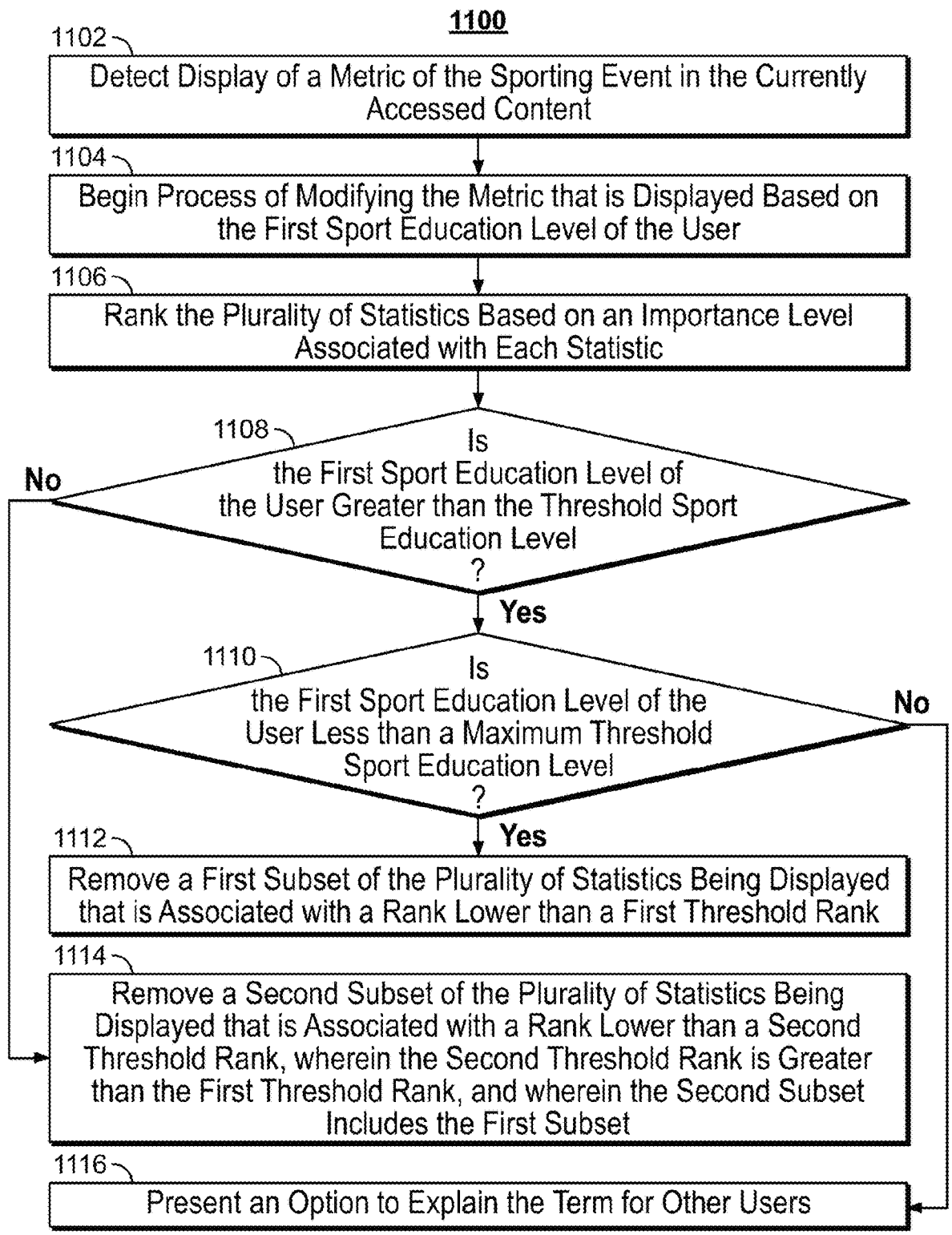
FIG. 11 is a flowchart of a detailed illustrative process for modifying a metric that is displayed based on the first sport education level of the user, in accordance with some embodiments of the disclosure.

FIG. 11 is a flowchart of a detailed illustrative process for modifying a metric that is displayed based on the first sport education level of the user, in accordance with some embodiments of the disclosure. It should be noted that process 1100 or any step thereof could be performed on, or provided by, any of the devices shown in FIGS. 4-5. For example, process 1100 may be executed by control circuitry 404 (FIG. 4) as instructed by a media guidance application implemented on a user device (e.g., user equipment devices 502, 504, and/or 506 (FIG. 5)) in order to modify a metric that is displayed based on the first sport education level of the user. In addition, one or more steps of process 1100 may be incorporated into or combined with one or more steps of any other process or embodiment (e.g., as described in relation to FIGS. 1 and 6-10).

At step 1102, control circuitry 404 (FIG. 4) detects display of a metric of the sporting event type in the currently accessed content. For example, during a baseball game, a player may be approaching home plate to bat. As a result, the player's batting statistics may appear on the display of the user. Control circuitry 404 may identify the metrics by using computer vision (e.g., segmentation, edge detection, classification). This is further discussed in the description of FIG. 9.

At step 1104, in response to identifying a display of a metric (e.g., a plurality of statistics), control circuitry 404 (FIG. 4) begins the process of modifying the metric that is displayed, based on the sport education level of the user.

At step 1106, control circuitry 404 (FIG. 4) ranks the plurality of statistics based on an importance level associated with each statistic. Revisiting the previous example, when a player's batting statistics are shown on the screen, the metrics may include "batting average," "on-base percentage," "slugging percentage," and "on-base plus slugging percentage." Control circuitry 404 may determine the importance of each statistic by referring to the sports database in storage 408 (FIG. 4). The sports database may include a section that lists metrics associated with a sport, and organizes them based on importance. Furthermore, each metric may have a threshold sport education level associated with it. The importance of a metric may be a pre-determined value (e.g., on a scale from 1-10 or a qualitative description such as "very important") assigned by the sports organization associated with the sporting event type (e.g., MLB is associated with baseball). Suppose that accordingly, control circuitry 404 ranks "batting average" as 1 (e.g., first-most important), "on-base percentage" as 2, "slugging percentage" as 3, and "on-base plus slugging percentage" as 4 (e.g., least-most important), based on the importance listed in the sports database.

In some embodiments, control circuitry 404 may determine the importance of a metric based on the frequency at which appears during a sporting event. For example, control circuitry 404 may analyze previous media assets associated with the sporting event type and count the number of references made to a specific metric. Control circuitry 404 may then organize the list of metrics in the sports database based on the frequency of appearance of a metric.

At step 1108, control circuitry 404 (FIG. 4) determines whether the first sport education level of the user is greater than the threshold sport education level. Control circuitry 404 may retrieve the first sport education level from the user profile in storage 408 (FIG. 4) and the threshold sport education level from the metrics section of the sports database in storage 408. Suppose that control circuitry 404 determines that the first sport education level, on a scale of 1-10, is 5 and the threshold sport education level is 3. Therefore, control circuitry 404 may determine that the user's first sport education level is greater than the threshold sport education level.

At step 1110, control circuitry 404 (FIG. 4) determines whether the first sport education level of the user is less than a maximum threshold sport education level. As mentioned previously, the maximum threshold sport education level represents the highest sport education a user can achieve and signifies that the user has expert knowledge of the sport. If the scale of education levels is 1-10, the maximum threshold sport education level is 10. Therefore, control circuitry 404 may determine that the user's first sport education level is less than the maximum threshold sport education level.

At step 1112, control circuitry 404 (FIG. 4) removes a first subset of the plurality of statistics being displayed that is associated with a rank greater than a first threshold rank, in response to determining that the first sport education level of the user is greater than the threshold sport education level and less than a maximum threshold sport education level. Suppose that the first threshold rank is 2 (e.g., retrieved from the sports database in storage 408 (FIG. 4)), the user's first education level is 5, the threshold sport education level is 3, and the maximum threshold sport education level is 10. Control circuitry 404 may determine that the user's first sport education level is greater than the threshold sport education level and is lower than the maximum threshold sport education level. This may signify that the user is familiar enough with the sport to understand a certain set of terms or metrics, but not perhaps the complex ones. It should be noted that the terms and metrics that appear more frequently may be marked with greater importance. Accordingly, control circuitry 404 may remove a first subset of the plurality of statistics that is associated with a rank lower than the first threshold rank. In this example, control circuitry 404 may remove "slugging percentage" and "on-base plus slugging percentage" from display 412 (FIG. 4) because they rank lower than the first threshold rank.

Suppose that at step 1108, control circuitry 404 (FIG. 4) determines that the first sport education level of the user is less than the threshold sport education level. In response, the process may advance to step 1114 where control circuitry 404 removes a second subset of the plurality of statistics being displayed that is associated with a rank lower than a second threshold rank, wherein the second threshold rank is greater than the first threshold rank, and wherein the second subset includes the first subset. For example, the user's sport education level may be 2 and the threshold sport education level may be 3. Therefore, control circuitry 404 may determine that the user's sport education level is lower than the threshold sport education level (e.g., the user is not fully familiar with the sport). The second threshold rank may be 1, a value greater than the first threshold rank. Control circuitry 404 may therefore remove all metrics that rank below the second threshold rank. In this case, the second subset would therefore include "on-base percentage," "slugging percentage," and "on-base plus slugging percentage." It should be noted that "slugging percentage" and "on-base plus slugging percentage" were part of the first subset. Thus, the second subset includes the first subset. In some embodiments, in place of the removed metrics, control circuitry 404 may present trivia and fun facts to the user on display 412 (FIG. 4) about the metrics that are still being displayed to the user. For example, control circuitry 404 may replace the section displaying "on-base percentage," "slugging percentage," and "on-base plus slugging percentage" with an overlay with trivia about "batting average" (e.g., "Did you know: Player X currently has the highest batting average in the league").

At step 1116, control circuitry 404 (FIG. 4) presents the user with an option to explain the metrics for other users in response to determining that the user's first sport education level is not less than the maximum threshold sport education level. In this case, control circuitry 404 may classify the user as an expert in the sport. Accordingly, control circuitry 404 may generate an option on display 412 (FIG. 4) allowing the user to choose whether he/she wants to provide an explanation of the term/metric for other users that may access the content. If the user accepts to provide an explanation, control circuitry 404 may generate a user input interface 410 (FIG. 4) that allows the user to enter an explanation. Control circuitry 404 then collects the user's explanation and may advance to step 1006 in FIG. 10.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 11.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for educating a user about a sporting event, the method comprising:
   detecting that a user is accessing content associated with a sporting event;
   processing metadata associated with the accessed content to identify a term or concept related to the sporting event;
   determining an education level of the user, wherein the education level is based on the frequency, recency, and duration of interactions with content related to a specific sport associated with the sporting event;
   generating a tailored explanation of the identified term or concept; and
   presenting the tailored explanation to the user while the user accesses the content.

2. The method of claim 1, wherein the explanation for the term is transmitted to a user's secondary device.

3. The method of claim 1, further comprising:
   transmitting the detected term to a user's associated social network;
   receiving input from users of the social network that provides an explanation for the term; and
   generating an explanation for the term based on common elements in the received input.

4. The method of claim 3, wherein the generated explanation is based on the received input with the highest number of acknowledgments on the social network.

5. The method of claim 1, wherein the sporting event is a live event, the method further comprising:
   determining whether closed captioning is available for the event
   extracting and cross-referencing terms from the closed captioning data with a sports database to identify terms unique to the specific type of sporting event;
   updating the tailored explanation and its presentation based on the terms identified.

6. The method of claim 1, further comprising:
   using computer vision techniques to identify metrics displayed during a sports event broadcast; and
   modifying the display of these metrics based on the user's assessed education level.

7. The method of claim 6, wherein modifying the display of metrics comprises removing metrics from the display based on their importance and the user's assessed education level.

8. The method of claim 7, further comprising:
   replacing removed metrics on the display with trivia or fun facts related to the sport or remaining metrics.

9. The method of claim 7, wherein metrics removed from the display are sent to a secondary device of the user.

10. The method of claim 1, further comprising:
    receiving input from the user that identifies a set of experts on the social network; and
    referring to these experts when generating explanations for detected terms.

11. A system for educating a user about a sporting event, the system comprising control circuitry configured to:
    detect that a user is accessing content associated with a sporting event;
    process metadata associated with the accessed content to identify a term or concept related to the sporting event;
    determine an education level of the user, wherein the education level is based on the frequency, recency, and duration of interactions with content related to a specific sport associated with the sporting event;
    generate a tailored explanation of the identified term or concept; and
    present the tailored explanation to the user while the user accesses the content.

12. The system of claim 11, wherein the control circuitry is further configured to transmit the explanation for the term to a user's secondary device.

13. The system of claim 11, wherein the control circuitry is further configured to:
    transmit the detected term to a user's associated social network;
    receive input from users of the social network that provides an explanation for the term; and
    generate an explanation for the term based on common elements in the received input.

14. The system of claim 13, wherein the control circuitry generates the explanation based on the received input with the highest number of acknowledgments on the social network.

15. The system of claim 11, wherein the control circuitry, in instances where the sporting event is a live event, is further configured to:
    determine whether closed captioning is available for the event;
    extract and cross-reference terms from the closed captioning data with a sports database to identify terms unique to the specific type of sporting event;
    update the tailored explanation and its presentation based on the terms identified.

16. The system of claim 11, wherein the control circuitry is further configured to:
    use computer vision techniques to identify metrics displayed during a sports event broadcast; and
    modify the display of these metrics based on the user's assessed education level.

17. The system of claim 16, wherein the control circuitry, while modifying the display of metrics, removes metrics from the display based on their importance and the user's assessed education level.

18. The system of claim 17, wherein the control circuitry is further configured to replace removed metrics on the display with trivia or fun facts related to the sport or remaining metrics.

19. The system of claim 17, wherein the control circuitry sends metrics removed from the display to a secondary device of the user through a network interface.

20. The system of claim 11, wherein the control circuitry is further configured to:
- receive input from the user that identifies a set of experts on the social network; and
- refer to these experts when generating explanations for detected terms.

* * * * *